US011881173B2

(12) United States Patent
Liu et al.

(10) Patent No.: US 11,881,173 B2
(45) Date of Patent: Jan. 23, 2024

(54) DISPLAY MODULE AND ELECTRONIC DEVICE

(71) Applicant: HUAWEI TECHNOLOGIES CO., LTD., Guangdong (CN)

(72) Inventors: Chun Yen Liu, Dongguan (CN); Ying Chieh Chen, Shenzhen (CN); Chihche Liu, Shenzhen (CN); Dustin Yuk Lun Wai, Shenzhen (CN); Chiaching Chu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/801,742

(22) PCT Filed: Nov. 12, 2020

(86) PCT No.: PCT/CN2020/128434

§ 371 (c)(1),
(2) Date: Aug. 23, 2022

(87) PCT Pub. No.: WO2021/169413

PCT Pub. Date: Sep. 2, 2021

(65) Prior Publication Data

US 2023/0142259 A1 May 11, 2023

(30) Foreign Application Priority Data

Feb. 25, 2020 (CN) ......................... 202010117429.4

(51) Int. Cl.
*G09G 3/3258* (2016.01)

(52) U.S. Cl.
CPC ... *G09G 3/3258* (2013.01); *G09G 2300/0408* (2013.01); *G09G 2300/0426* (2013.01);
(Continued)

(58) Field of Classification Search
CPC ......... G09G 3/3233; G09G 2300/0819; G09G 2300/0852
See application file for complete search history.

(56) References Cited

U.S. PATENT DOCUMENTS

| | | | |
|---|---|---|---|
| 7,952,545 | B2 | 5/2011 | Benjamin et al. |
| 8,237,639 | B2 | 8/2012 | Yamashita et al. |

(Continued)

FOREIGN PATENT DOCUMENTS

| | | | |
|---|---|---|---|
| CN | 101083049 | A | 12/2007 |
| CN | 102956185 | A | 3/2013 |

(Continued)

*Primary Examiner* — Van N Chow
(74) *Attorney, Agent, or Firm* — HUAWEI TECHNOLOGIES CO., LTD.

(57) ABSTRACT

This application provide a display module and an electronic device, to reduce a probability of a display flicker. A display module includes a display, a display driver circuit, and at least one driver group; the display includes M rows of sub pixels; each driver group includes M gating circuits; an N$^{th}$ gating circuit is configured to: receive a first initial voltage Vinit1 and a second initial voltage Vinit2 from the display driver circuit, output the second initial voltage Vinit2 to a second electrode of a first reset transistor and a first electrode of a voltage modulation transistor, and output the first initial voltage Vinit1 to the second electrode of the first reset transistor and the first electrode of the voltage modulation transistor.

10 Claims, 22 Drawing Sheets

(52) U.S. Cl.
CPC ............... *G09G 2300/0819* (2013.01); *G09G 2300/0842* (2013.01); *G09G 2310/08* (2013.01); *G09G 2320/0247* (2013.01)

(56) References Cited

U.S. PATENT DOCUMENTS

| | | | | |
|---|---|---|---|---|
| 2003/0227431 | A1 | 12/2003 | Chung et al. | |
| 2008/0273000 | A1 | 11/2008 | Park et al. | |
| 2011/0157144 | A1 | 6/2011 | Park et al. | |
| 2011/0234553 | A1 | 9/2011 | Omoto | |
| 2017/0047027 | A1 | 2/2017 | Nambi et al. | |
| 2017/0110054 | A1* | 4/2017 | Sun | G09G 3/3233 |
| 2017/0256200 | A1* | 9/2017 | Duan | G09G 3/3233 |
| 2017/0302265 | A1 | 10/2017 | Wang et al. | |
| 2022/0139307 | A1* | 5/2022 | Zhang | G09G 3/3233 345/204 |
| 2022/0327998 | A1* | 10/2022 | Liu | G09G 3/3266 |

FOREIGN PATENT DOCUMENTS

| | | | |
|---|---|---|---|
| CN | 106298952 | A | 1/2017 |
| CN | 107863070 | A | 3/2018 |
| CN | 110178174 | A | 8/2019 |
| CN | 110675816 | A | 1/2020 |
| CN | 110808005 | A | 2/2020 |
| JP | 2004093682 | A | 3/2004 |
| KR | 20100102934 | A | 9/2010 |
| RU | 2504022 | C1 | 1/2014 |
| RU | 2639941 | C2 | 12/2017 |
| WO | 2018094954 | A1 | 5/2018 |

* cited by examiner

DISPLAY MODULE AND ELECTRONIC DEVICE

CROSS-REFERENCE TO RELATED APPLICATIONS

This application is a national stage of International Application No. PCT/CN2020/128434, filed on Nov. 12, 2020, which claims priority to Chinese Patent Application No. 202010117429.4, filed on Feb. 25, 2020. Both of the aforementioned applications are hereby incorporated by reference in their entireties.

TECHNICAL FIELD

This application relates to the field of display technologies, and in particular, to a display module and an electronic device.

BACKGROUND

With continuous development of display technologies, an electronic device such as a mobile phone may display both a dynamic picture and a static picture. When some dynamic pictures are displayed, an image refresh rate (namely, a quantity of image refresh times per second) needs to be increased to reduce dynamic blurring. However, when the static picture such as a standby picture is displayed, a relatively high refresh rate causes an increase in power consumption of the electronic device. To reduce power consumption, a relatively low refresh rate may be used when the electronic device displays the static picture. However, in this case, a display flicker occurs on the electronic device, and a display effect is reduced.

SUMMARY

Embodiments of this application provide a display module and an electronic device, to reduce a probability of a display flicker occurring when a display displays an image at a low refresh rate.

To achieve the foregoing objective, the following technical solutions are used in the embodiments of this application.

According to a first aspect of the embodiments of this application, a display module is provided, including a display, a display driver circuit, and at least one driver group. The display includes M rows of sub pixels arranged in a matrix form, and a pixel circuit of each sub pixel includes a first compensation transistor, a second compensation transistor, a voltage modulation transistor, a driver transistor, a first reset transistor, a first capacitor, and a light-emitting component, where M≥2, and M is a positive integer. A first electrode of the first compensation transistor is coupled to a second electrode of the second compensation transistor and a second electrode of the voltage modulation transistor, a second electrode of the first compensation transistor is coupled to a gate of the driver transistor, and a first end of the first capacitor is coupled to a first electrode of the first reset transistor; a first electrode of the second compensation transistor is coupled to a second electrode of the driver transistor and an anode of the light-emitting component, and a gate of the first compensation transistor and a gate of the second compensation transistor are configured to receive a gating signal N; a first electrode of the voltage modulation transistor is coupled to a second electrode of the first reset transistor, and a gate of the voltage modulation transistor is configured to receive a light-emitting control signal; a second end of the first capacitor is coupled to a first power voltage input end; a first electrode of the driver transistor is coupled to the first power voltage input end or a data voltage output port of the display driver circuit; a gate of the first reset transistor is configured to receive a gating signal N−1; and a cathode of the light-emitting component is coupled to a second power voltage input end, where 1≤N≤M, and N is a positive integer. The first electrode is a source and the second electrode is a drain, or the first electrode is a drain and the second electrode is a source, the first power voltage input end is configured to input a first power voltage, and the data voltage output port is configured to output a data voltage. Each driver group includes M gating circuits; an $N^{th}$ gating circuit is coupled to the second electrode of the first reset transistor in a pixel circuit of an $N^{th}$ row of sub pixels and the first electrode of the voltage modulation transistor in the pixel circuit of the $N^{th}$ row of sub pixels; the $N^{th}$ gating circuit is further coupled to the display driver circuit, and is configured to: receive a first initial voltage Vinit1 and a second initial voltage Vinit2 from the display driver circuit, output the second initial voltage Vinit2 to the second electrode of the first reset transistor and the first electrode of the voltage modulation transistor when the pixel circuit is in a reset phase and a data voltage writing phase, and output the first initial voltage Vinit1 to the second electrode of the first reset transistor and the first electrode of the voltage modulation transistor when the pixel circuit is in a light-emitting phase; and the first initial voltage Vinit1 meets at least one of the following conditions: Vinit1>Vinit2 and Vinit1>(ELVSS+Voled), where ELVSS is a voltage output by the second power voltage input end, and Voled is a voltage drop of the light-emitting component. The reset phase is a phase in which the first reset transistor is conducted, the data voltage writing phase is a phase in which the data voltage is applied to the first electrode of the driver transistor, and the light-emitting phase is a phase in which the light-emitting component emits light.

According to the display module provided in the embodiments of this application, a leakage current of the first reset transistor and a leakage current of the compensation transistor are reduced, so that when a low refresh rate is used, a probability of a display flicker caused by a relatively large voltage drop of a gate voltage of the driver transistor in the light-emitting phase due to the leakage current is reduced. Specifically, for the first reset transistor and the compensation transistor, the leakage current of the first reset transistor and the leakage current of the compensation transistor may be reduced by reducing a source-drain voltage of the first reset transistor and a source-drain voltage of the compensation transistor are reduced. Because a source-drain path of the first compensation transistor and a source-drain path of the second compensation transistor are connected in series, a leakage current of the first compensation transistor directly affects a leakage current obtained after the first compensation transistor and the second compensation transistor are combined. A relatively high first initial voltage Vinit1 is connected in the light-emitting phase, to reduce the source-drain voltage of the first reset transistor M1 and the source-drain voltage of the first compensation transistor. In this way, the leakage current of the first reset transistor and the leakage current of the first compensation transistor are separately reduced, to reduce a display flicker problem in the light-emitting phase.

In a possible implementation, the display further includes M first initial voltage lines, each gating circuit includes a first gating transistor and a second gating transistor, the display driver circuit includes at least one first signal end and at least one second signal end, the first signal end outputs the first initial voltage Vinit1, and the second signal end outputs the second initial voltage Vinit2. A second electrode of the first gating transistor in the $N^{th}$ gating circuit and a second electrode of the second gating transistor in the $N^{th}$ gating circuit are coupled to the first electrode of the voltage modulation transistor in the pixel circuit of the $N^{th}$ row of sub pixels and the second electrode of the first reset transistor M1 in the pixel circuit of the $N^{th}$ row of sub pixels through an $N^{th}$ first initial voltage line. A first electrode of the first gating transistor is coupled to the first signal end, and a first electrode of the second gating transistor is coupled to the second signal end. A gate of the first gating transistor is configured to receive a light-emitting control signal, and a gate of the second gating transistor is configured to receive a phase-inverted signal of the light-emitting control signal, where the light-emitting control signal takes effect in the light-emitting phase and fails in a non-light-emitting phase. This implementation provides a possible implementation of the gating circuit.

In a possible implementation, the display further includes M second initial voltage lines, and the pixel circuit further includes a second reset transistor. A first electrode of the second reset transistor is coupled to the light-emitting component, a second electrode of the second reset transistor in the pixel circuit of the $N^{th}$ row of sub pixels is coupled to the second signal end of the display driver circuit through an $N^{th}$ second initial voltage line, and a gate of the second reset transistor is coupled to the gate of the first reset transistor. The first initial voltage or the second initial voltage is output from a left side and a right side respectively to the second electrode of the first reset transistor in a same row of sub pixels. In this way, a problem of signal attenuation can be effectively reduced.

In a possible implementation, the at least one driver group includes a first driver group and a second driver group, and the first driver group and the second driver group are respectively located on the left and the right of a display area of the display. Both an $N^{th}$ gating circuit in the first driver group and an $N^{th}$ gating circuit in the second driver group are coupled to the second electrode of the first reset transistor in the pixel circuit of the $N^{th}$ row of sub pixels and the first electrode of the voltage modulation transistor in the pixel circuit of the $N^{th}$ row of sub pixels.

In a possible implementation, the display module includes a substrate, the pixel circuit, the display driver circuit, and the driver group are disposed on the substrate, and a material of the substrate includes a glass substrate, a flexible material, or a tensile material. The material of the substrate is not limited in this application.

In a possible implementation, a value range of the first initial voltage Vinit1 is Vinit1>0V.

In a possible implementation, the pixel circuit further includes a data writing transistor, a first electrode of the data writing transistor is configured to receive the data voltage output by the data voltage output port of the display driver circuit, a second electrode of the data writing transistor is coupled to the first electrode of the driver transistor, a gate of the data writing transistor is configured to receive a gating signal N, and a channel width of the data writing transistor is less than or equal to 2 um. The channel width of the data writing transistor is reduced, and a leakage current of the data written into the transistor can be reduced, so that when a low refresh rate is used, a probability of a display flicker caused by a relatively large voltage drop of a gate voltage of the driver transistor in the light-emitting phase due to the leakage current is reduced.

In a possible implementation, a channel width of at least one of the first reset transistor, the first compensation transistor, the second compensation transistor, and the voltage modulation transistor is less than or equal to 2 um. Leakage currents of transistors may be reduced by reducing channel widths of these transistors, so that when a low refresh rate is used, a probability of a display flicker caused by a relatively large voltage drop of a gate voltage of the driver transistor in the light-emitting phase due to the leakage current is reduced.

According to a second aspect, a display module is provided, including a display and a display driver circuit. The display includes M rows of sub pixels arranged in a matrix form, a pixel circuit of each sub pixel includes a data writing transistor, a compensation transistor, a driver transistor, a first reset transistor, a first capacitor, and a light-emitting component, where M≥2, and M is a positive integer. A first electrode of the data writing transistor is configured to receive a data voltage output by a data voltage output port of the display driver circuit, a second electrode of the data writing transistor is coupled to a first electrode of the driver transistor, and a gate of the data writing transistor is configured to receive a gating signal N; a first electrode of the compensation transistor is coupled to a second electrode of the driver transistor and the light-emitting component, a second electrode of the compensation transistor is coupled to a gate of the driver transistor, a first end of the first capacitor, and a first electrode of the first reset transistor, and a gate of the compensation transistor is configured to receive the gating signal N; a second end of the first capacitor is coupled to a first power voltage input end; a gate of the first reset transistor is configured to receive a gating signal N−1; and a second electrode of the first reset transistor is configured to receive an initial voltage Vinit, where 1≤N≤M, and N is a positive integer. The first electrode is a source and the second electrode is a drain, or the first electrode is a drain and the second electrode is a source, the first power voltage input end is configured to input a first power voltage, and the data voltage output port is configured to output a data voltage. A channel width of at least one of the first reset transistor, the compensation transistor, and the data writing transistor is less than 2 um.

According to the display module provided in the embodiments of this application, a leakage current of the first reset transistor, a leakage current of the compensation transistor, and a leakage current of the data writing transistor may be reduced by reducing the channel width of at least one of the first reset transistor, the compensation transistor, and the data writing transistor, so that when a low refresh rate is used, a probability of a display flicker caused by a relatively large voltage drop of a gate voltage of the driver transistor in the light-emitting phase due to the leakage current is reduced.

According to a third aspect, an electronic device is provided, including the display module according to the first aspect or the second aspect. For a technical effect of this implementation, refer to the content in the first aspect or the second aspect. Details are not described herein again.

DESCRIPTION OF EMBODIMENTS

The following describes the technical solutions in the embodiments of this application with reference to the accompanying drawings in the embodiments of this application. It is clear that the described embodiments are merely a part rather than all of the embodiments of this application.

The following terms "first" and "second" are merely intended for a purpose of description, and shall not be understood as an indication or implication of relative importance or implicit indication of a quantity of indicated technical features. Therefore, a feature limited by "first" or "second" may explicitly or implicitly include one or more such features. In the descriptions of this application, unless otherwise stated, "plurality" means two or more than two.

In addition, in this application, orientation terms such as "upper", "lower", "left", and "right" are defined relative to orientations of the components in the accompanying drawings. It should be understood that these orientation terms are relative concepts and are used for relative description and clarification, and may change correspondingly according to a change in a position in which a component is placed in the accompanying drawings.

Transistors in the embodiments of this application are all P-type transistors. A first electrode of a transistor is a source (s), and a second electrode of the transistor is a drain (d). When a gate (g) of the transistor receives a low voltage level, the transistor is in a conducting state, and when the gate g of the transistor receives a high voltage level, the transistor is in a cut-off state. Similarly, for an N-type transistor, a first electrode of a transistor is a drain d, and a second electrode is a source s. When a gate (g) of the transistor receives a high voltage level, the transistor is in a conducting state, and when the gate g of the transistor receives a low voltage level, the transistor is in a cut-off state.

The embodiments of this application provide an electronic device. The electronic device includes, for example, a television, a mobile phone, a tablet computer, a personal digital assistant (PDA), and a vehicle-mounted computer. A specific form of the electronic device is not specifically limited in the embodiments of this application. For ease of description, the following uses an example in which the electronic device is the mobile phone for description.

Figure 1A:
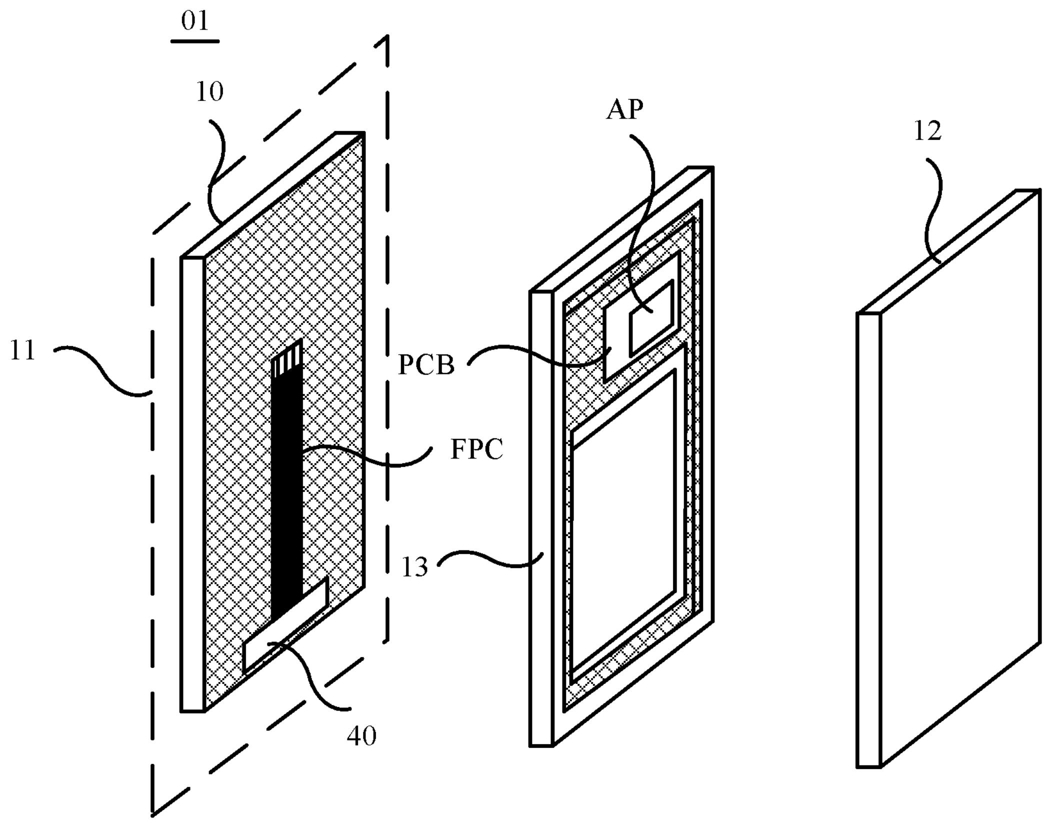
FIG. 1*a* is a schematic structural diagram of an electronic device according to some embodiments of this application.

As shown in FIG. 1*a,* an electronic device 01 includes a display module 11 and a housing 12. Optionally, the electronic device 01 may further include a middle frame 13.

In a possible implementation, a printed circuit board (PCB) or a flexible printed circuit (FPC) may be installed on the housing 12, and an application processor (AP) is disposed on the PCB or the FPC. The display module 11 may be installed on the housing 12 and coupled to the PCB or the FPC.

In another possible implementation, the PCB or the FPC may be installed on the middle frame 13, and the display module 11 may be installed on the middle frame 13 and coupled to the PCB or the FPC. The housing 12 is installed on the other side of the middle frame 13. This implementation is used as an example in this application, but is not intended to be limited thereto. The display module 11 may include at least one display 10 and a display driver circuit The display 10 may include a substrate. In some embodiments of this application, a material of the substrate may include a glass substrate or a flexible material. The flexible material may be flexible glass, or polyimide (PI). Alternatively, in some other embodiments of this application, the material of the substrate may further include a tensile material. A deformation amount of the tensile material may be greater than or equal to 5%. For example, the tensile material may be polydimethylsiloxane (PDMS). In this case, the display 10 may be a flexible display that can be stretched and bent. The electronic device 01 having the flexible display may be referred to as a fordable mobile phone or a fordable tablet computer. Alternatively, the material of the substrate may alternatively include a material with a relatively hard texture, such as hard glass or sapphire. In this case, the display 10 is a hard display.

In a possible implementation, the display module may have two displays 10, and the two displays 10 may be respectively disposed on two sides of the middle frame 13.

In other words, one display 10 is embedded in the housing 12 or directly replaces the housing 12. In this way, both a front surface and a rear surface of the electronic device can be used for displaying.

Figure 1B:
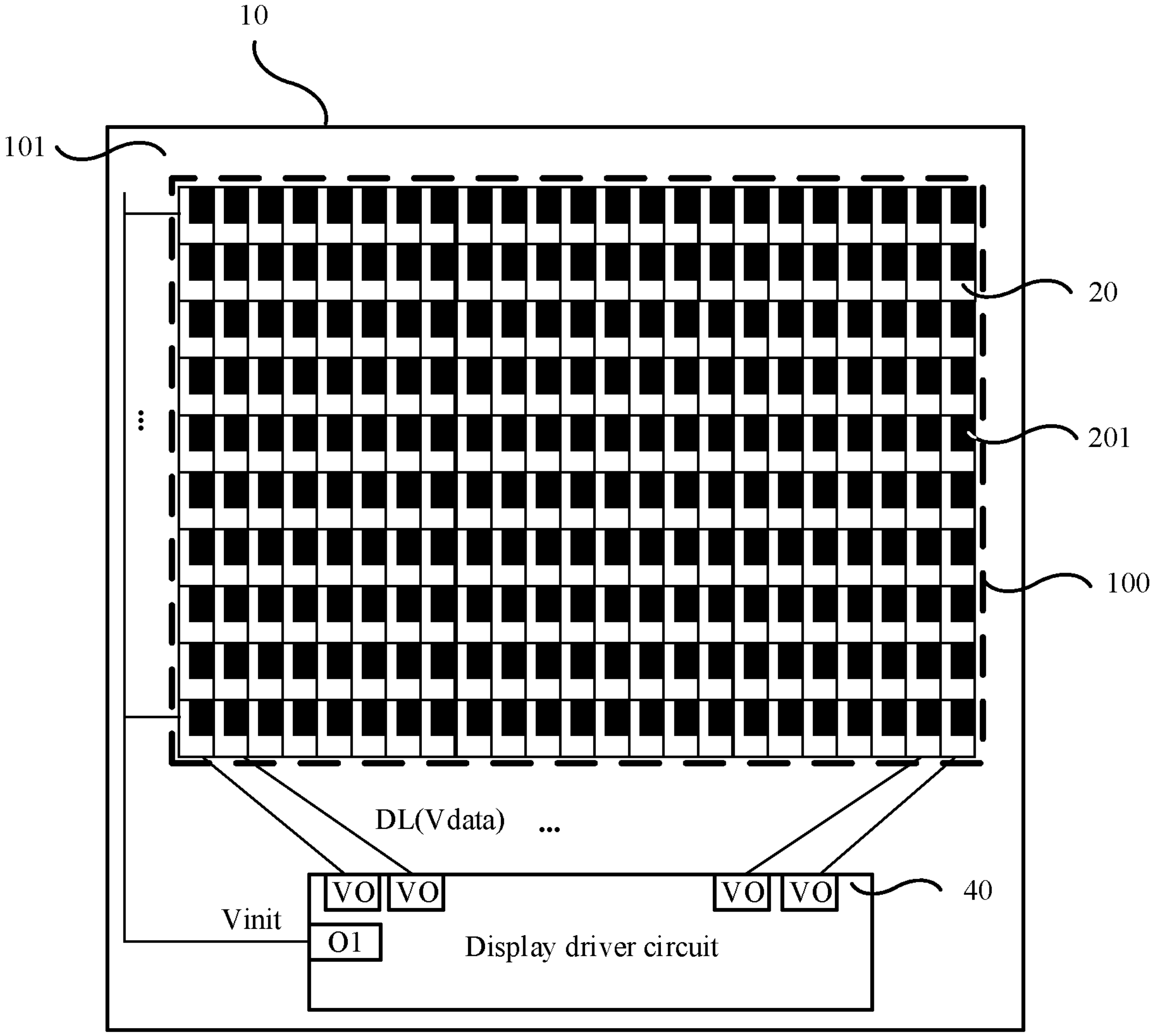
FIG. 1*b* is a schematic structural diagram of a display in FIG. 1*a*.

As shown in FIG. 1*b,* the display 10 includes an active display area (AA) 100 and a non-display area 101 located around the AA area 100.

The AA area 100 is used to display an image. The AA area 100 includes M rows of sub pixels 20 arranged in a matrix form, where M≥2, and M is a positive integer. A pixel circuit 201 that is configured to control a sub pixel 20 to perform displaying is disposed in the sub pixel 20. The sub pixel may also be referred to as a sub pixel or a sub pixel. In this embodiment of this application, sub pixels 20 arranged in a row in a horizontal direction X are referred to as sub pixels in a same row, and sub pixels 20 arranged in a column in a vertical direction Y are referred to as sub pixels in a same column.

The display driver circuit 40 may be installed in the non-display area 101. The display driver circuit 40 is configured to drive the display 10 to display an image. For example, the display driver circuit 40 may be a display driver integrated circuit (DDIC). The display driver circuit 40 includes at least one data voltage output port VO and at least one first signal end O1.

The data voltage output port VO of the display driver circuit 40 is coupled to a pixel circuit 201 of at least one column of sub pixels 20 through a data line (DL), and the data voltage output port VO is configured to output a data voltage Vdata. The first signal end O1 of the display driver circuit 40 is coupled to a pixel circuit 201 of each row of sub pixels 20. The first signal end O1 is configured to output an initial voltage Vinit. For example, the initial voltage Vinit may be—4V.

Figure 1C:
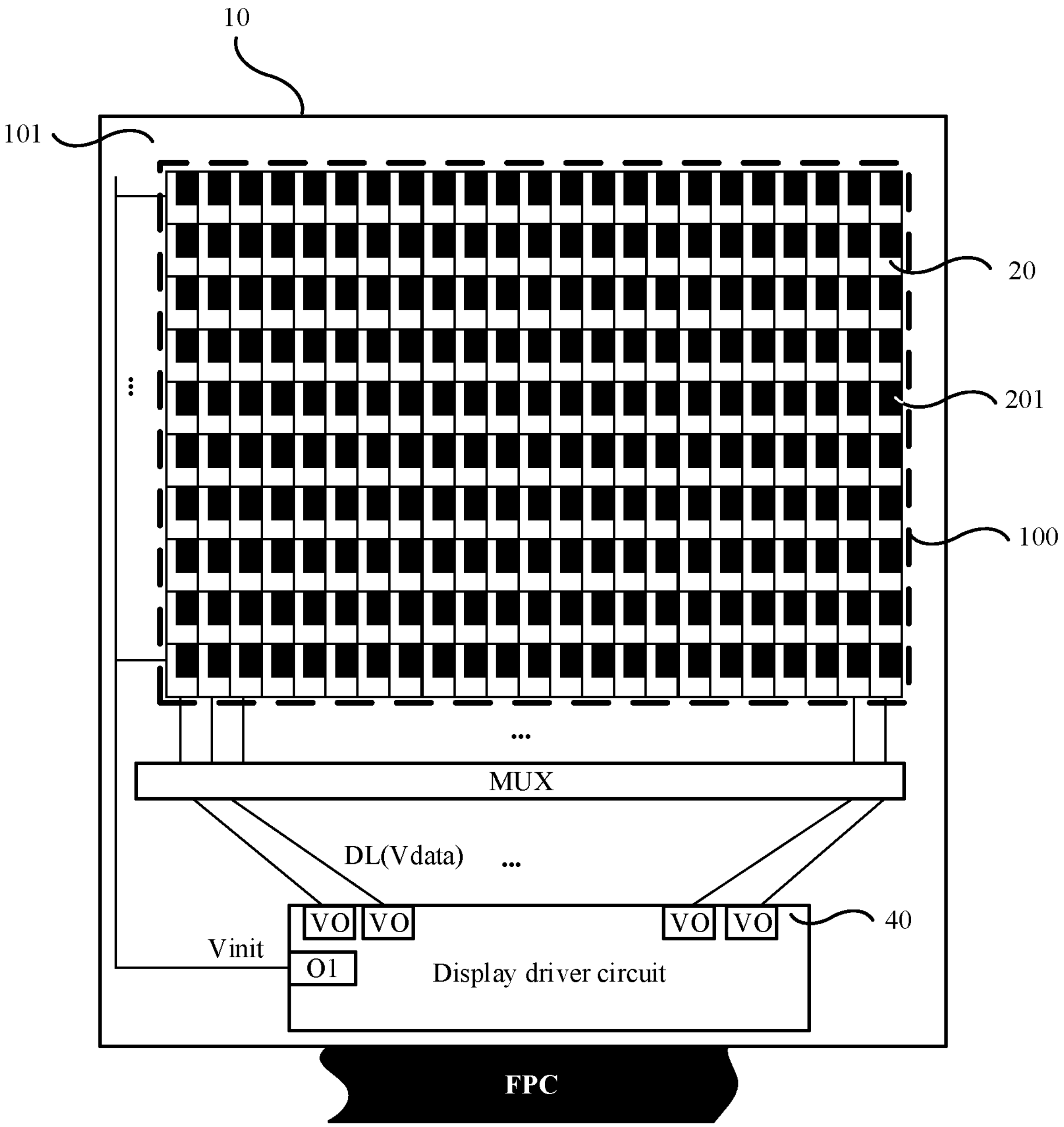
FIG. 1*c* shows a manner of coupling a data line and a display driver circuit according to an embodiment of this application.

As shown in FIG. 1*c*, the data voltage output end VO of the display driver circuit 40 may be coupled to the data line DL by using a multiplexer (MUX). The MUX may select, based on a requirement, only some data lines DL in a time period to separately receive the data voltage Vdata output by the data voltage output end VO of the display driver circuit 40.

Figure 1D:
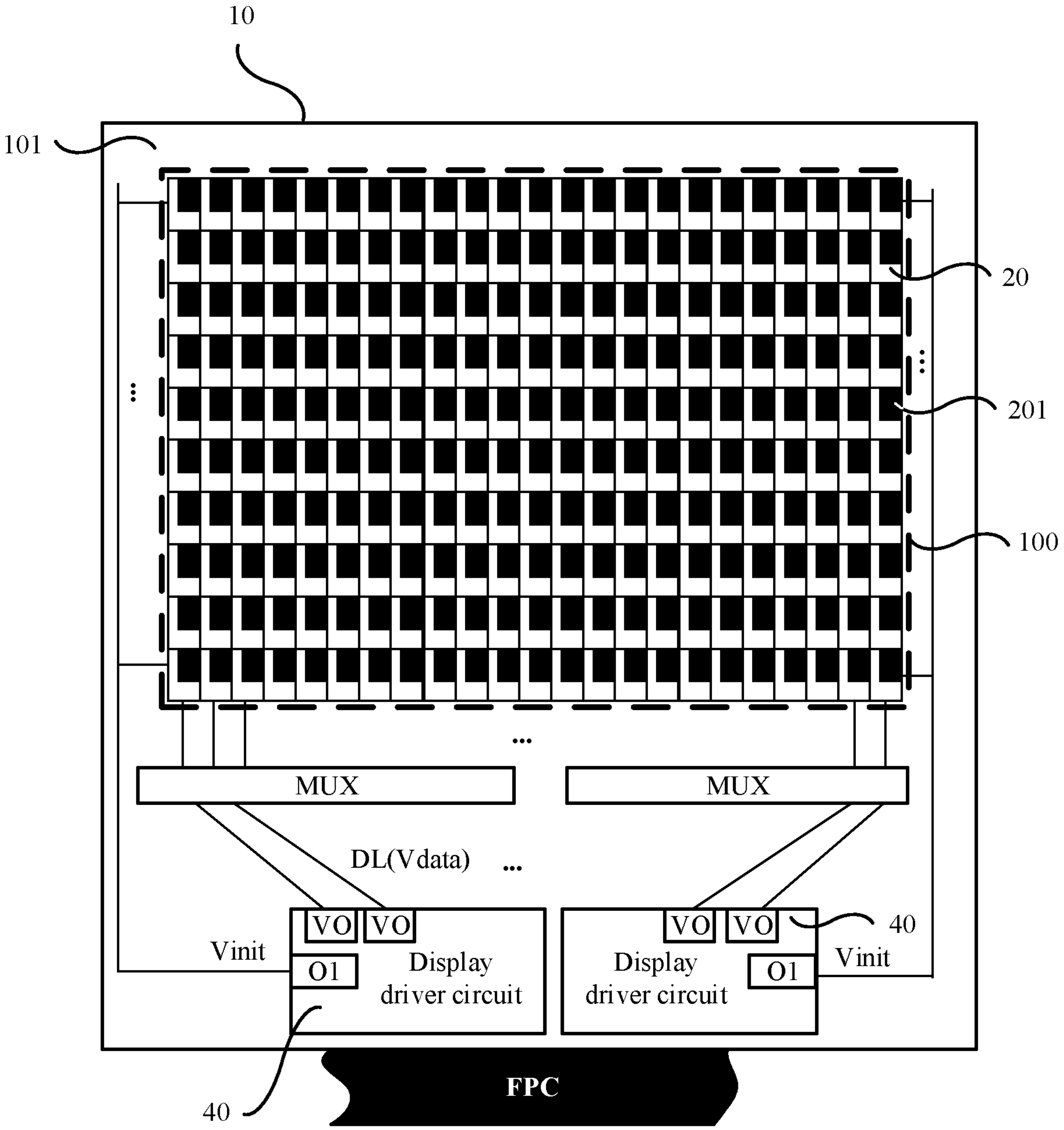
FIG. 1*d* shows another manner of coupling a data line and a display driver circuit according to an embodiment of this application.

When a size of the display 10 is relatively large, and a quantity of a row of sub pixels 20 is relatively large, a quantity of data lines DL disposed in the display 10 also increases. As shown in FIG. 1*d,* the electronic device 01 may include a plurality of MUXs and a plurality of display driver circuits 40. A data voltage output end VO of one display driver circuit 40 is coupled to some data lines DL by using a corresponding MUX.

Figure 3:
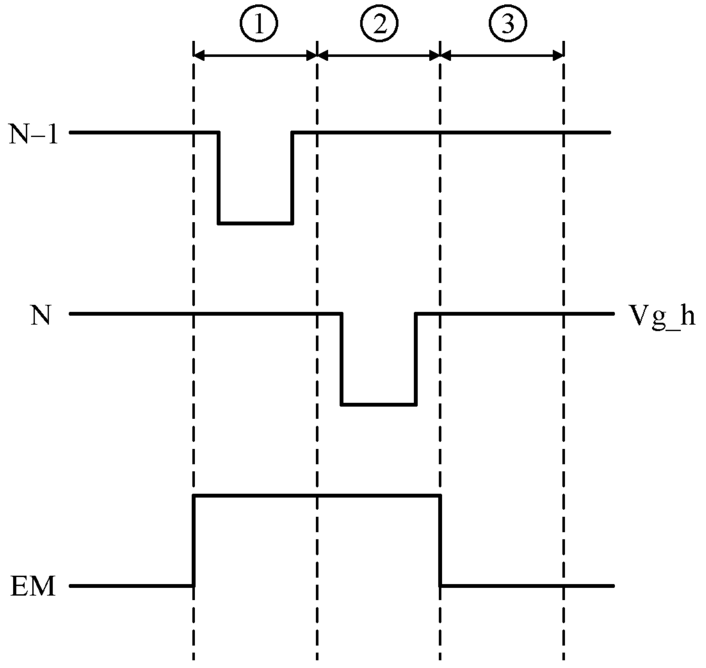
FIG. 3 is a schematic diagram of timing control of the pixel circuit shown in FIG. 2*a;*

An operating process of the pixel circuit 201 includes three phases shown in FIG. 3: a first phase ①, a second phase ②, and a third phase ③. The first phase ① may be referred to as a reset phase, the second phase ② may be referred to as a data voltage writing phase, and the third phase ③ may be referred to as a light-emitting phase.

Because the sub pixels 20 in the display 10 are scanned and emit light row by row, pixel circuits 201 are also gated row by row. Each pixel circuit 201 may be controlled by using a gating signal N, a gating signal N−1, and a light-emitting control signal EM that are shown in FIG. 3. The gating signal N−1 is used to control a pixel circuit 201 in sub pixels 20 in an (N−1) th row to enter the second phase ②, and control a pixel circuit 201 in sub pixels 20 in an $N^{th}$ row to enter the first phase ①, the gating signal N is used to control the pixel circuit 201 in the sub pixels 20 in the $N^{th}$ row to enter the second phase ②, and the light-emitting control signal EM is used to control the pixel circuit 201 in the sub pixels 20 in the $N^{th}$ row to enter the third phase ③, where 1≤N≤M, and N is a positive integer.

Figure 2A:
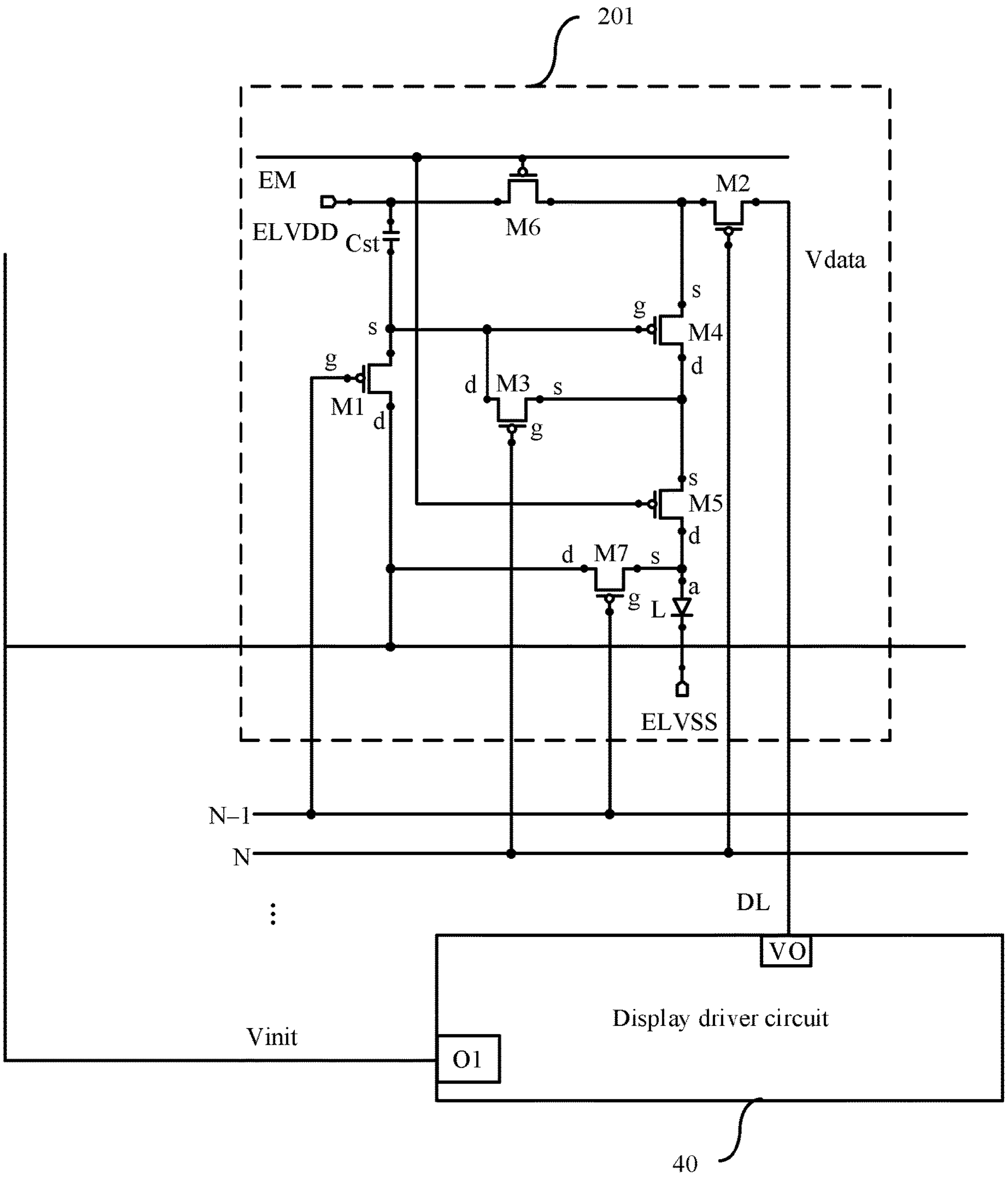
FIG. 2*a* is a schematic structural diagram of a pixel circuit according to an embodiment of this application.

FIG. 2*a* shows a pixel circuit of a 7T1C (namely, seven transistors (T) and one capacitor (C)) structure. The pixel circuit 201 includes at least a first reset transistor M1, a data writing transistor M2, a compensation transistor M3, a driver transistor M4, a first light-emitting control transistor M5, a second light-emitting control transistor M6, a second reset transistor M7, a first capacitor Cst, and a light-emitting component L.

For example, the light-emitting component L may be an organic light-emitting diode (OLED), and the display 10 may be an OLED display. The light-emitting component L may alternatively be a micro light-emitting diode (micro LED), and the display 10 may be a micro LED display. In this application, an example in which the light-emitting component L is the OLED is used, but the present invention is not intended to be limited thereto.

A gate of the first reset transistor M1 is configured to receive the gating signal N−1. A first electrode (for example, a source) of the first reset transistor M1 is coupled to a second electrode (for example, a drain d) of the compensation transistor M3, a gate g of the driver transistor M4, and a first end of the first capacitor Cst (for example, a lower plate of the first capacitor Cst in FIG. 2*a*). A second electrode (for example, a drain d) of the first reset transistor M1 is coupled to a second electrode (for example, a drain d) of the second reset transistor M7, and is configured to receive the initial voltage Vinit.

A first electrode (for example, a source s) of the data writing transistor M2 is configured to receive the data voltage Vdata output by the data voltage output port VO of the display driver circuit 40. A second electrode (for example, a drain d) of the data writing transistor M2 is coupled to a second electrode (for example, a drain d) of the second light-emitting control transistor M6 and a first electrode (for example, a source s) of the driver transistor M4. A gate g of the data writing transistor M2 is configured to receive the gating signal N.

A first electrode (for example, a source s) of the compensation transistor M3 is coupled to a second electrode (for example, a drain d) of the driver transistor M4 and a first electrode (for example, a source s) of the first light-emitting control transistor M5. A gate g of the compensation transistor M3 is configured to receive the gating signal N.

A second electrode (for example, a drain d) of the second light-emitting transistor M5 is coupled to an anode (anode, a) of the light-emitting component L (for example, the OLED) and a first electrode (for example, a source s) of the second reset transistor M7. A gate g of the first light-emitting control transistor M5 is configured to receive the light-emitting control signal EM. A cathode (cathode, c) of the light-emitting component L is coupled to a second power voltage input end (configured to output a second power voltage ELVSS).

A first electrode (for example, a source s) of the second light-emitting control transistor M6 is coupled to a first power voltage input end and a second end of the first capacitor Cst (for example, an upper plate of the first capacitor Cst in FIG. 2*a*), to receive a first power voltage ELVDD input by the first power voltage input end. A gate g of the second light-emitting control transistor M6 is configured to receive the light-emitting control signal EM.

A gate g of the second reset transistor M7 is coupled to a gate g of the first reset transistor M1, and is configured to receive the gating signal N−1.

Figure 2B:
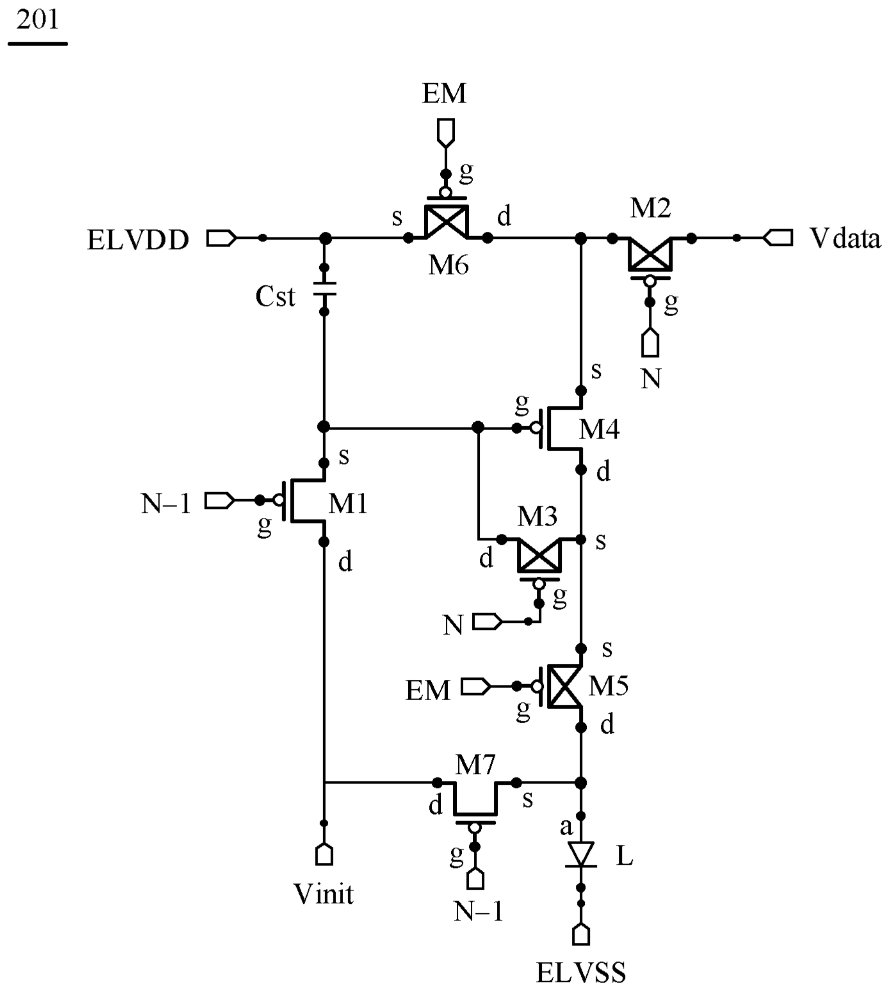
FIG. 2*b*, FIG. 2*c*, and FIG. 2*d* are respectively schematic diagrams of equivalent circuits when a pixel circuit is in a first phase ①, a second phase ②, and a third phase ③.
Figure 2C:
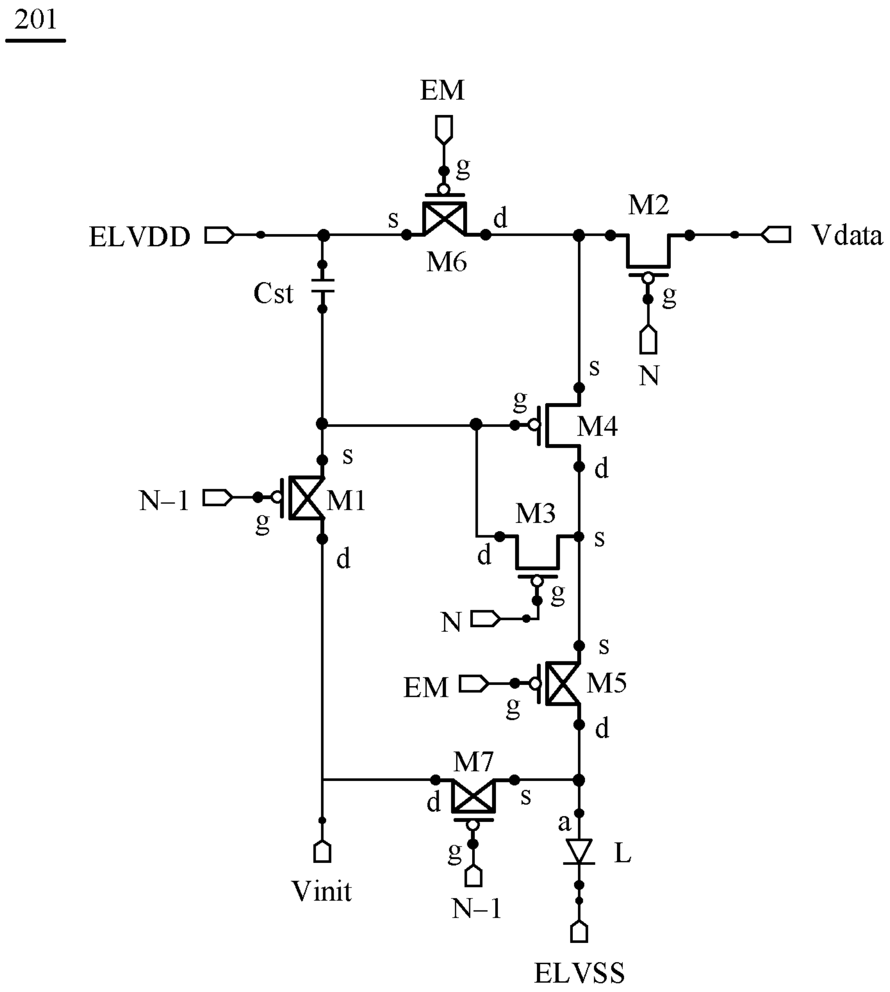
Figure 2D:
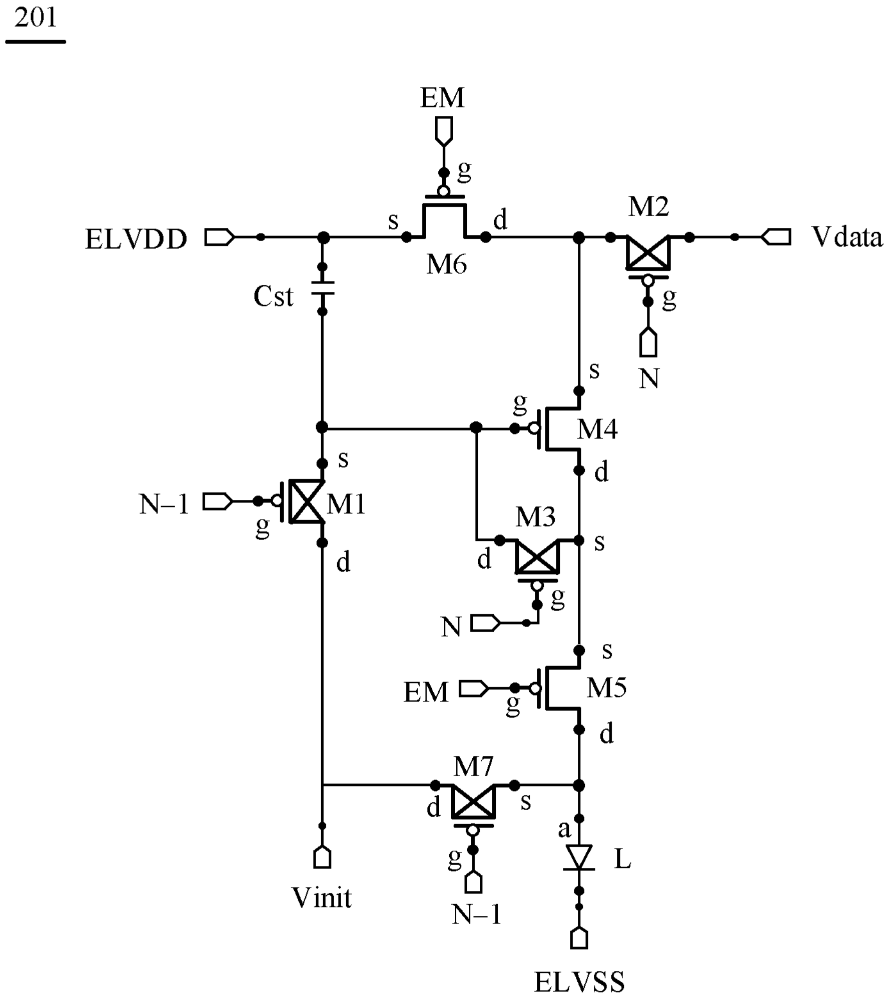

Based on the structure of the pixel circuit 201 shown in FIG. 2*a*, the following separately describes in detail the three phases shown in FIG. 3 in FIG. 2*b*, FIG. 2*c*, and FIG. 2*d*. For clarity of description, a "×" mark is added to a cut-off transistor, and no "×" mark is added to a conducted transistor.

First phase CD (reset phase):

As shown in FIG. 2*b*, when the gating signal N−1 is at a low voltage level, the first reset transistor M1 and the second reset transistor M7 are conducted. The initial voltage Vinit is transmitted to the gate g of the driver transistor M4 through the first reset transistor M1, to reset the gate g of the driver transistor M4. In addition, the initial voltage Vinit is transmitted to the anode a of the light-emitting component L (for example, the OLED) through the second reset transistor M7, to reset the light-emitting component L (for example, the OLED).

In this case, both a voltage Va of the anode a of the light-emitting component L (for example, the OLED) and a voltage Vg4 of the gate g of the driver transistor M4 are equal to the initial voltage Vinit. As shown in Table 1, a drain-source voltage Vsd1 of the first reset transistor M1 is a conduction voltage drop of the transistor, which is about 0.1V, and a drain-source voltage of the compensation transistor M3 is Vsd3=Vinit−(ELVSS+Voled). Vth_M4 is a threshold voltage of the driver transistor M4, and Voled is a voltage drop of the light-emitting component L (for example, the OLED).

In the first phase ①, the voltage of the gate g of the driver transistor M4 and the voltage of the anode a of the light-emitting component L (for example, the OLED) may be reset to the initial voltage Vinit, so as to prevent a previous frame of image from remaining on the voltage of the gate g of the driver transistor M4 and the voltage of the anode a of the light-emitting component L (for example, the OLED) and affecting a next frame of image. Therefore, the first phase ① may be referred to as the reset phase. It can be learned from the foregoing description that the reset phase is a phase in which the first reset transistor M1 is conducted.

Second phase ② (data voltage writing phase):

As shown in FIG. 2*c*, when the gating signal N is at a low voltage level, the data writing transistor M2 and the compensation transistor M3 are conducted.

When the data writing transistor M2 is conducted, the first electrode (for example, the source s) of the driver transistor M4 is coupled to the data voltage output port VO of the display driver circuit 40. Therefore, the data voltage Vdata output by the data voltage output port VO may be received in the data voltage writing phase. In other words, a source voltage of the driver transistor M4 is Vs4=Vdata. Therefore, the data voltage writing phase is a phase in which the data voltage Vdata is applied to the first electrode (for example, the source s) of the driver transistor M4.

When the compensation transistor M3 is conducted, the gate g of the driver transistor M4 is coupled to the drain d of the driver transistor M4. In other words, the gate voltage Vg4 of the driver transistor M4 is the same as a drain d voltage Vd4 of the driver transistor M4, and the driver transistor M4 is in a conducting state.

It can be learned based on a conduction feature of the transistor that the drain voltage of the driver transistor M4 is Vd4=Vs4−|Vth_M4|=Vdata−|Vth_M4|, where Vth_M4 is the threshold voltage of the driver transistor M4. Because the compensation transistor M3 is conducted, the gate voltage Vg4 of the driver transistor M4 is the same as the drain d voltage Vd4 of the driver transistor M4. Therefore, an end voltage of the first capacitor Cst is equal to the gate voltage Vg4 of the driver transistor M4, where Vg4=Vdata−|Vth_M4|. In other words, the gate voltage Vg4 of the driver transistor M4 is related to the threshold voltage Vth_M4 of the driver transistor M4.

As shown in Table 1, because the first reset transistor M1 is cut off, a drain voltage of the first reset transistor M1 is Vd1=Vinit=−4V, and a source voltage Vs1 of the first reset transistor M1 is the same as the gate voltage Vg4 of the driver transistor M4, where Vs1=Vdata−|Vth_M4|,the drain-source voltage of the first reset transistor M1 is Vsd1=Vs1−Vd1=Vdata−|Vth_M4|−Vinit=Vdata−|Vth_M4|−(−4). The drain-source voltage Vsd3 of the compensation transistor M3 is the conduction voltage drop of the transistor, which is about 0.1V.

Third phase ③ (light-emitting phase):

As shown in FIG. 2*d*, when the light-emitting control signal EM is at a low voltage level, the first light-emitting control transistor M5 and the second light-emitting control transistor M6 are conducted.

The first electrode (for example, the source s) of the driver transistor M4 is coupled to the first power voltage input end, so that the first power voltage ELVDD output by the first power voltage input end can be received in the light-emitting phase. The first electrode (for example, the source s) of the compensation transistor M3 and the second electrode (for example, the drain d) of the driver transistor M4 may be coupled to the anode a of the light-emitting component L. Therefore, a current path between the first power voltage ELVDD and the second power voltage ELVSS is conducted.

The first capacitor Cst generates a driver current Isd through the driver transistor M4, and transmits the driver current Isd to the light-emitting component L (for example, the OLED) through the current path, to drive the light-emitting component L (for example, the OLED) to emit light. It can be learned from the foregoing description that the light-emitting phase is a phase in which the light-emitting component L (for example, the OLED) is driven to emit light.

In this case, as shown in Table 1, the source voltage Vs1 of the first reset transistor M1, a drain voltage Vd3 of the compensation transistor M3, and the gate voltage Vg4 of the driver transistor M4 are the same, which are all Vdata−|Vth_M4|, that is, Vs1=Vd3=Vg4=Vdata−|Vth_M4|. A drain voltage Vd1 of the first reset transistor M1 is equal to the initial voltage Vinit, and therefore, the drain-source voltage of the first reset transistor M1 is Vsd1=Vs1−Vd1=Vdata−|Vth_M4|−Vinit=Vdata−|Vth_M4|−(−4).

The drain voltage of the compensation transistor M3 is Vd3=ELVSS+Voled, and therefore, the drain-source voltage of the compensation transistor M3 is Vsd3=Vs3−Vd3=Vdata−|Vth_M4|−(ELVSS+Voled).

A source-gate voltage of the driver transistor M4 is Vsg4=Vs4−Vg4=ELVDD−(Vdata−|Vth_M4|).

In addition, the driver current Isd for driving the light-emitting component L (for example, the OLED) to emit light satisfies the following formula:

$$Isd=\tfrac{1}{2}\times\mu\times Cgi\times W/L\times(Vsg4-|Vth\_M4|)^2 \quad \text{Formula 1.}$$

μ is a carrier mobility rate of the driver transistor M4, Cgi is a capacitance between the gate g of the driver transistor M4 and a channel, W/L is a width-to-length ratio of the driver transistor M4, and Vth_M4 is the threshold voltage of the driver transistor M4.

It can be learned according to the formula 1 that the driver current for driving the light-emitting component L (for example, the OLED) to emit light is Isd=½×μ×Cgi×W/L×(ELVDD−Vdata+|Vth_M4|−|Vth_M4|)$^2$=½×μ×Cgi×W/L×(ELVDD−Vdata).

Because the driver current Isd is irrelevant to the threshold voltage Vth_M4 of the driver transistor M4, a phenomenon of uneven luminance caused by a difference between threshold voltages of driver transistors can be avoided. Therefore, after threshold voltage compensation in the data voltage writing phase (the second phase ② in FIG. 3), even luminance of the display 10 may be implemented in the light-emitting phase (the third phase ③ shown in FIG. 3). Because the light-emitting component L (for example, the OLED) emits light in the third phase ③, the third phase ③ may be referred to as the light-emitting phase.

Based on the structure of the pixel circuit, the sub pixels 20 in the display 10 are scanned and emit light row by row. Therefore, when a frame of image is displayed, after sub pixels in a first row emit light, a light-emitting state needs to be maintained until sub pixels 20 in a last row emit light, so that the frame of image can be displayed. When the display 10 displays a dynamic picture, a refresh rate of 60 Hz may be used.

Figure 4:
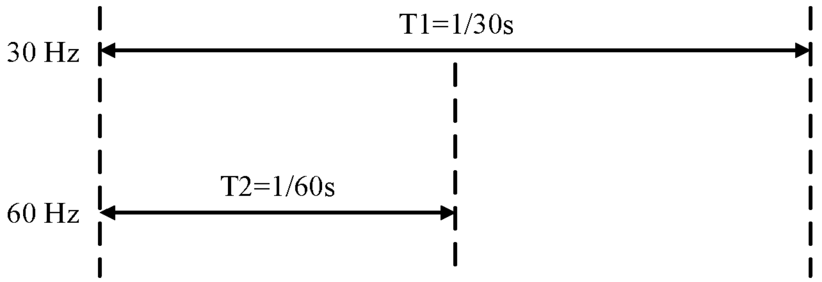
FIG. 4 is a comparison diagram of duration of a frame of image at 60 Hz and 30 Hz according to some embodiments of this application.

As shown in FIG. 4, time T2 of a frame of image is 1/60s. When the display 10 of the electronic device 01 displays a static picture (for example, a standby picture), to reduce power consumption of the electronic device 01, a refresh rate less than 60 Hz (for example, 30 Hz) may be used. In this case, as shown in FIG. 4, time T1 of a frame of image is 1/30s. T1 is greater than T2.

In other words, when the display 10 uses a relatively low refresh rate, time of a frame of image increases. Therefore, for sub pixels 20 in a same row, when the refresh rate of 30 Hz is used, duration Δt1 in which the row of the sub pixels 20 keep emitting light, namely, duration of the light-emitting phase (the third phase ③ in FIG. 3), is about 1/30s. When the refresh rate is 60 Hz, duration Δt2 in which the row of the sub pixels 20 keep emitting light is about 1/60s. That is, Δt1 is greater than Δt2.

Based on this, when a sub pixel 20 emits light, an electric quantity Q of a first capacitor Cst in the pixel circuit 201 of the sub pixel 20 meets the following formula:

$$Q=C\times\Delta V=I_{off\_M1}\times\Delta t \quad \text{Formula 2.}$$

C is a capacitance value of the first capacitor Cst, $I_{off\_M1}$ is a leakage current of the first reset transistor M1 in the light-emitting phase (the third phase ③ in FIG. 3), ΔV is a voltage drop of the gate voltage Vg4 of the driver transistor M4 in the light-emitting phase (the third phase ③ in FIG. 3), and Δt is duration in which the sub pixel 20 keeps emitting light.

It can be learned from the formula 2 that, when the capacitance value C of the first capacitor Cst and the leakage current $I_{off\_M1}$ of the first reset transistor M1 are fixed, because Δt1 is greater than Δt2, a voltage drop ΔV1 of the gate voltage Vg4 of the driver transistor M4 when the display 10 performs displaying at 30 Hz is greater than a voltage drop ΔV2 of the gate voltage Vg4 of the driver transistor M4 when the display 10 performs displaying at 60 Hz.

Figure 5:
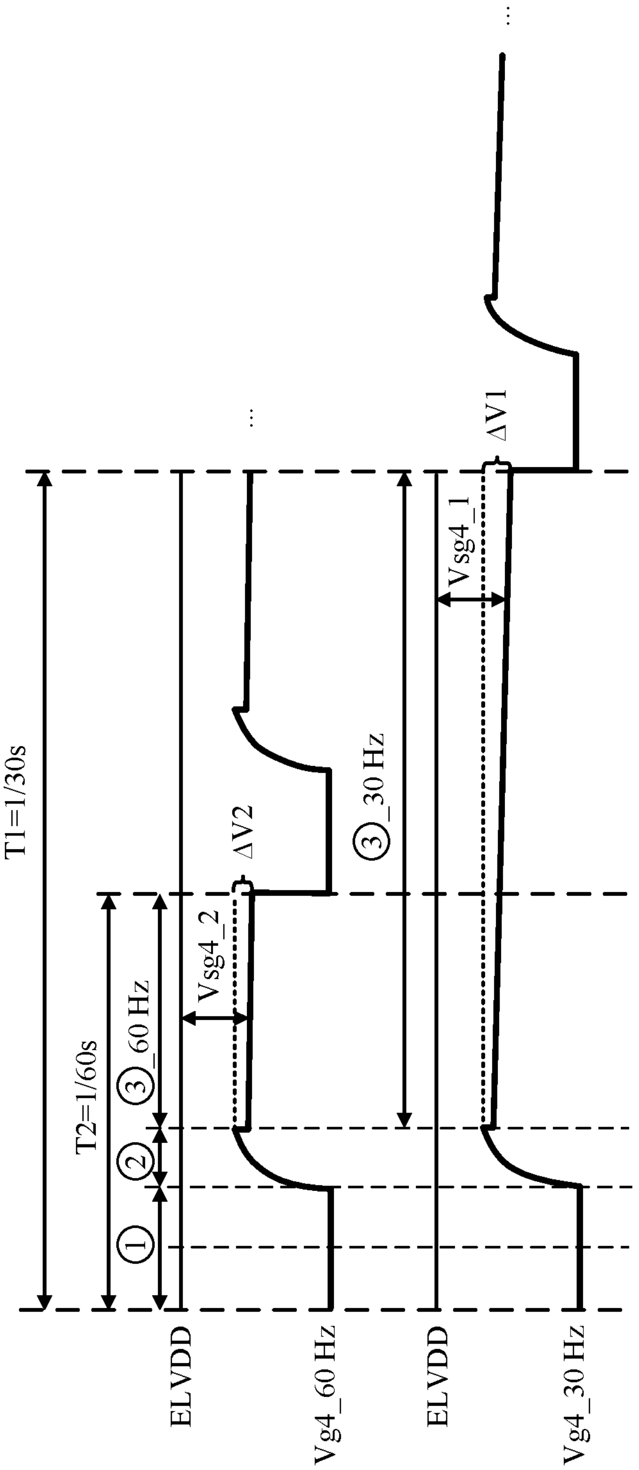
FIG. 5 is a comparison diagram of gate voltages and gate-source voltages of a driver transistor at 60 Hz and 30 Hz according to some embodiments of this application.

The gate-source voltage Vsg4 of the driver transistor M4 is a difference between the source voltage Vs4 and the gate voltage Vg4, that is, Vsg4=Vs4−Vg4, where it can be learned from FIG. 2*a* that Vs4=ELVDD, that is, the gate-source voltage Vs4 is constant. Because ΔV1>ΔV2, as shown in FIG. 5, a gate-source voltage Vsg4_1 of the driver transistor M4 when the display 10 performs displaying at 30 Hz is greater than a gate-source voltage Vsg4_2 of the driver transistor M4 when the display 10 performs displaying at 60 Hz, that is, Vsg4_1>Vsg4_2.

It can be learned according to the formula 1 that the driver current Isd for driving the light-emitting component L (for example, the OLED) to emit light is proportional to a square of the gate-source voltage Vsg4 of the driver transistor M4. Because Vsg4_1>Vsg4_2, a driver current Isd1 for driving the light-emitting component L (for example, the OLED) to emit light when the display 10 performs displaying at 30 Hz is greater than a driver current Isd2 for driving the light-emitting component L (for example, the OLED) to emit light when the display 10 performs displaying at 60 Hz, that is, Isd1>Isd2. In other words, when the display 10 is converted from a relatively high refresh rate 60 Hz to a relatively low refresh rate 30 Hz for displaying, a driver current flowing through the light-emitting component L (for example, the OLED) in the sub pixel 20 increases. In this case, when the refresh frequency alternates, luminance of the light-emitting component L (for example, the OLED) suddenly changes, and human eyes acutely captures the suddenly changed luminance. Consequently, the display flickers.

Based on the foregoing reason why the display 10 flickers, when the display 10 performs displaying at the low refresh rate of 30 Hz, in a possible implementation, a display flicker at the low refresh rate may be reduced by reducing the leakage current $I_{off\_M1}$ of the first reset transistor M1.

Specifically, when the display 10 performs displaying at the low refresh rate of 30 Hz, the voltage drop ΔV1 of the gate voltage Vg4 of the driver transistor M4 in the light-emitting phase (the third phase ③ in FIG. 3) may be reduced, so that the voltage drop ΔV1 is approximately equal to a value of the voltage drop LV2 of the gate voltage Vg4 of the driver transistor M4 when the display 10 perform displaying at 60 Hz. As shown in FIG. 5, when the display 10 performs displaying at 30 Hz, the gate-source voltage Vsg4_1 of the driver transistor M4 is reduced, so that the gate-source voltage Vsg4_1 is approximately equal to the gate-source voltage Vsg4_2 of the driver transistor M4 when the display 10 performs displaying at 60 Hz. Therefore, it can be learned from the formula (1) that the driver current Isd1 for driving the light-emitting component L (for example, the OLED) to emit light when the display 10 performs displaying at 30 Hz is approximately equal to the driver current Isd2 for driving the light-emitting component L (for example, the OLED) to emit light when the display 10 performs displaying at 60 Hz.

Figure 6:
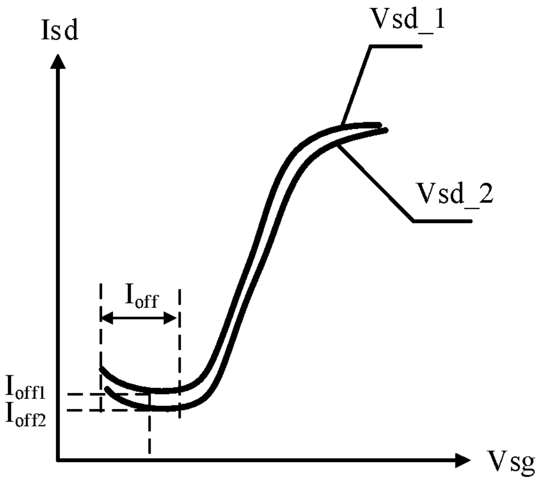
FIG. 6 is a schematic diagram of an I-V curve of a transistor according to some embodiments of this application.

FIG. 6 shows an I-V curve of a transistor. Each curve represents a case in which a leakage current $I_{off}$ of the transistor varies with a gate-source voltage Vsg when a source-drain voltage Vsd of the transistor is a specific value. For example, in FIG. 6, a Vsd_1 curve is located above a Vsd_2 curve. Therefore, Vsd_1>Vsd_2. When gate-source voltages Vsg are the same, a leakage current $I_{off1}$ corresponding to the Vsd_1 curve is greater than a leakage current $I_{off2}$ corresponding to the Vsd_2 curve. In other words, a larger source-drain voltage Vsd of the transistor indicates a larger leakage current $I_{off}$, and a smaller source-drain voltage Vsd of the transistor indicates a smaller leakage current $I_{off}$.

Therefore, to reduce the leakage current $I_{off\_M1}$ of the first reset transistor M1 in the light-emitting phase, the source-drain voltage Vsd1 of the first reset transistor M1 may be reduced.

In addition, as shown in FIG. 2*d*, transistors that are connected to the driver transistor M4 and that are in a cut-off state in the third phase 3 include the first reset transistor M1, the compensation transistor M3, and the data writing transistor M2. Therefore, the leakage current of the first reset transistor M1, a leakage current of the compensation transistor M3, and a leakage current of the data writing transistor M2 all cause the gate voltage Vg4 of the driver transistor M4 to generate a voltage drop ΔV in time in which the sub pixels 20 keep emitting light. However, when the sub pixels 20 display images of different gray scales, a display flicker degree caused by the leakage current of the first reset transistor M1 is different from a display flicker degree caused by the leakage current of the compensation transistor M3 or the leakage current of the data writing transistor M2.

Figure 7A:
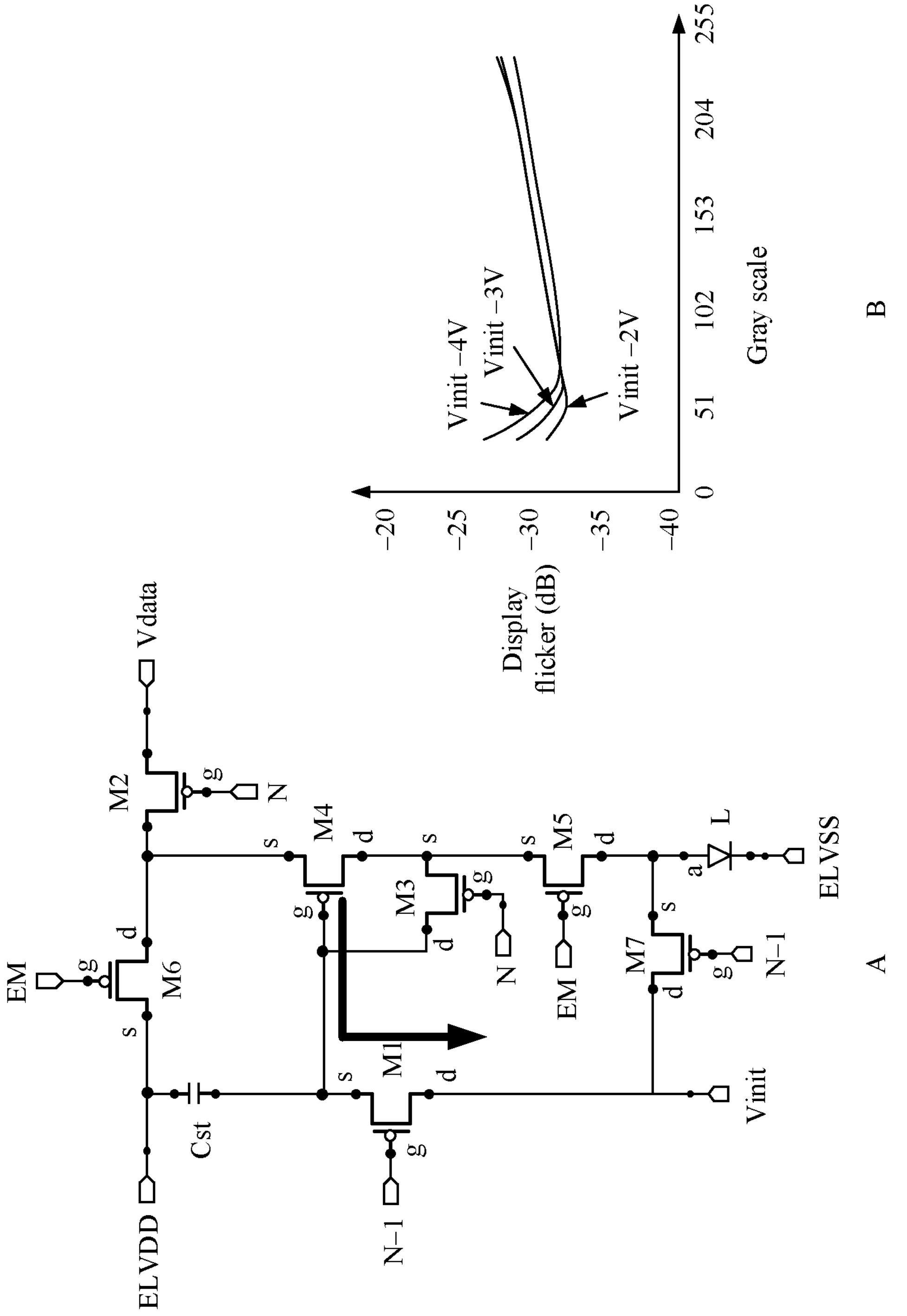
FIG. 7*a* is a schematic diagram of a relationship between a leakage current and a display flicker when a low gray scale image is displayed according to some embodiments of this application.

As shown by A in FIG. 7*a*, when the sub pixels 20 display an image with a low gray scale, a display flicker is mainly caused by the leakage current of the first reset transistor M1. As shown by B in FIG. 7*a*, in a case in which the first power voltage ELVDD is constant, the source-drain voltage Vsd of the first reset transistor M1 is reduced by increasing the initial voltage Vinit, to reduce the leakage current of the first reset transistor M1. Therefore, the display flicker can be reduced when the image with the low gray scale is displayed.

Figure 7B:
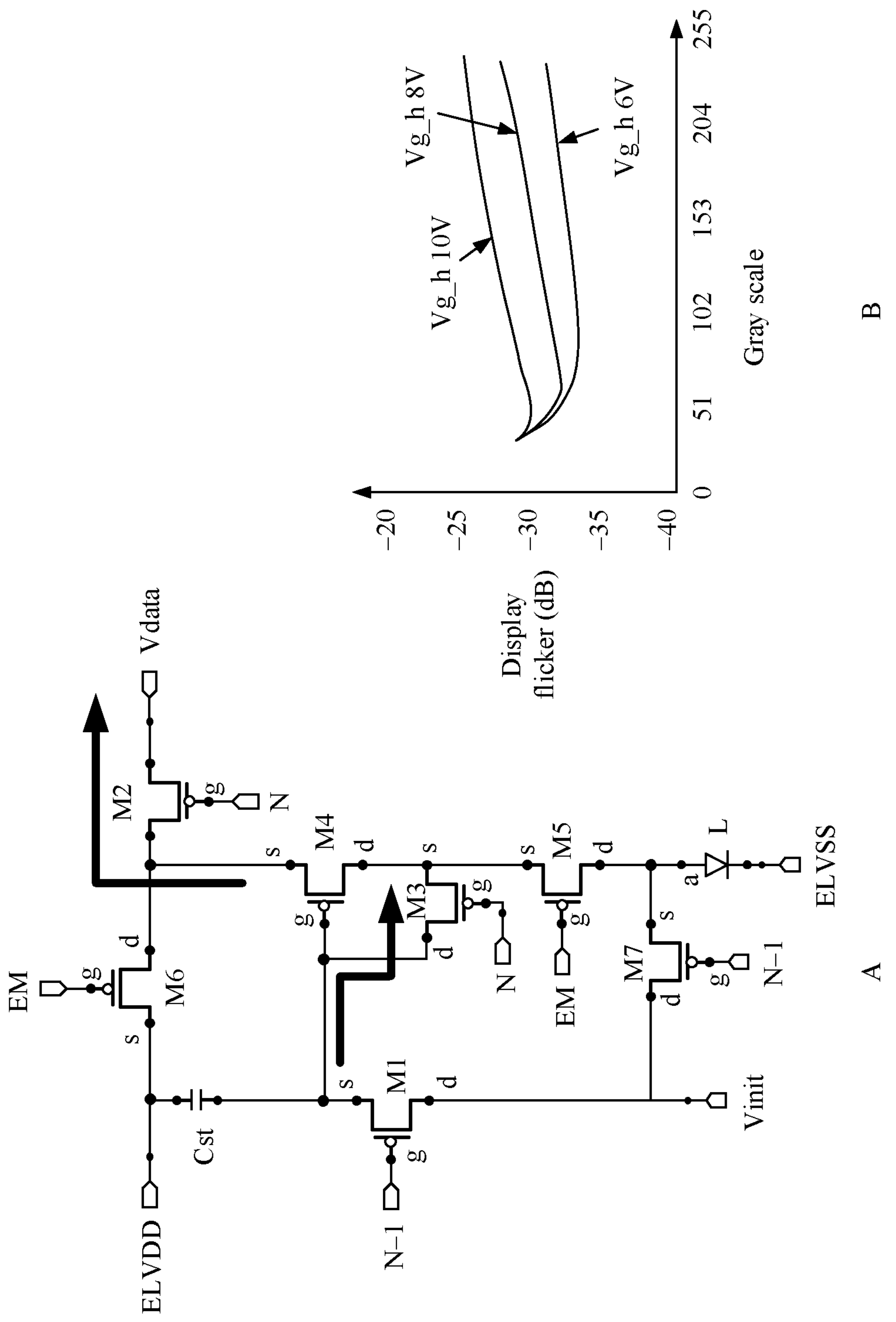
FIG. 7*b* is a schematic diagram of a relationship between a leakage current and a display flicker when a medium or high gray scale image is displayed according to some embodiments of this application.

As shown by A in FIG. 7*b*, when the sub pixels 20 display an image with a medium or high gray scale, a display flicker is mainly caused by the leakage current of the compensation transistor M3 and the leakage current of data writing transistor M2. As shown by B in FIG. 7*b*, a high voltage level Vg_h that is of the gating signal N and that is received by the gate g of the compensation transistor M3 is reduced (see FIG. 3), the gate-source voltage Vsg shown in FIG. 6 is increased (because Vsg=Vs−Vg, Vsg increases as Vg decreases), which is equivalent to increasing the source-drain voltage Vsd of the compensation transistor M3, to reduce the leakage current of the compensation transistor M3. Therefore, the display flicker can be reduced when the image with the medium or high gray scale is displayed.

In conclusion, the leakage current of the first reset transistor M1, the leakage current of the compensation transistor M3, and the leakage current of the data writing transistor M2 are reduced, so that when a low refresh rate is used, a probability of a display flicker caused by a relatively large voltage drop of the gate voltage Vg4 of the driver transistor M4 in the light-emitting phase due to the leakage current is reduced. For the first reset transistor M1 and the compensation transistor M3, the leakage current of the first reset transistor M1 and the leakage current of the compensation transistor M3 may be reduced by reducing the source-drain voltage and/or a channel width of the first reset transistor M1 and the source-drain voltage and/or a channel width of the compensation transistor M3. For the data writing transistor M2, the leakage current of the data writing transistor M2 may be reduced by reducing a channel width.

Figure 8A:
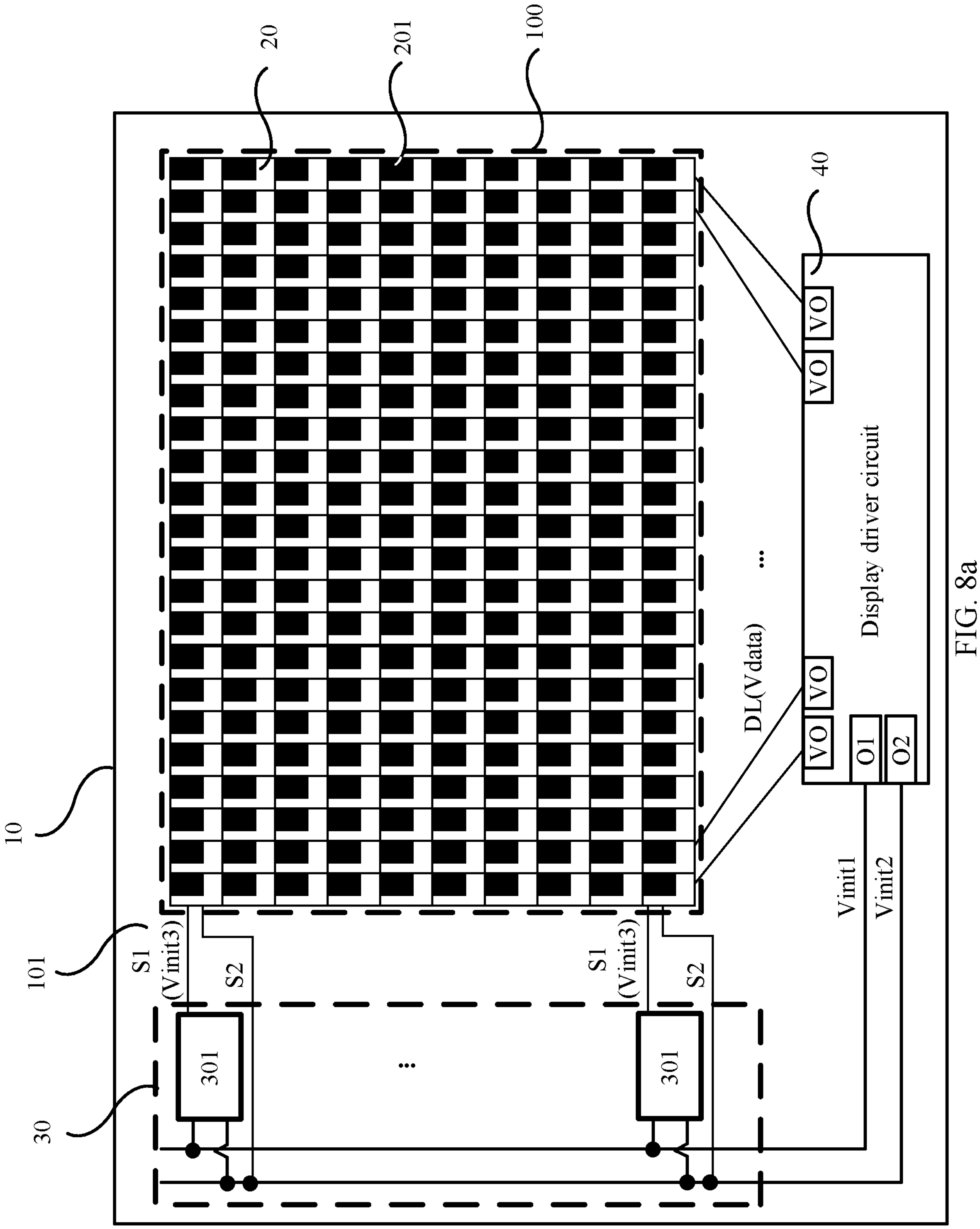
FIG. 8*a* is a schematic structural diagram of a display module according to an embodiment of this application.

As shown in FIG. 8*a*, an embodiment of this application provides another display module. Compared with the display module shown in FIG. 1*b*, the display module shown in FIG. 8*a* further includes M first initial voltage lines S1, M second initial voltage lines S2, and at least one driver group 30 disposed in the non-display area 101. It should be noted that the display module may also have the MUX and the display shown in FIG. 1*c* or FIG. 1*d*, and details are not described herein again.

The pixel circuit 201, the display driver circuit 40, and the driver group 30 may be disposed on the substrate described above.

Each driver group 30 includes M gating circuits 301. The display driver circuit 40 includes at least one data voltage output port VO, at least one first signal end O1, and at least one second signal end O2.

The data voltage output port VO of the display driver circuit 40 is coupled to a pixel circuit 201 of at least one column of sub pixels 20 through a data line (DL), and the data voltage output port VO is configured to output a data voltage Vdata. The first signal end O1 and the second signal end O2 of the display driver circuit 40 are separately coupled to the gating circuits 301 in each driver group 30. The second signal end O2 of the display driver circuit 40 is further coupled to the pixel circuit 201 of each sub pixel 20 through the second initial voltage line S2. The gating circuit 301 in each driver group 30 is coupled to the pixel circuit 201 of a row of sub pixels 20 through a first initial voltage line S1.

The first signal end O1 may output a first initial voltage Vinit1, and the second signal end O2 may output a second initial voltage Vinit2. In the light-emitting phase (the third phase 3 shown in FIG. ③), an absolute value of the second initial voltage is greater than an absolute value of the first initial voltage, that is, |Vinit2|>|Vinit1|. A value range of the first initial voltage Vinit1 may be Vinit1>0V. For example, the first initial voltage Vinit1 may be 0V, 1V, or 2V. The second initial voltage Vinit2 may be −4V.

An N$^{th}$ gating circuit 301 is coupled to the second electrode (for example, the drain) of the first reset transistor M1 in the pixel circuit 201 in the N$^{th}$ row of sub pixels 20 and the first electrode (for example, a source) of a voltage modulation transistor Mc in the pixel circuit 201 in the N$^{th}$ row of sub pixels 20. The N$^{th}$ gating circuit 301 is further coupled to the first signal end O1 and the second signal end O2 of the display driver circuit 40, and is configured to select one of the first initial voltage Vinit1 and the second initial voltage Vinit2 that are output by the display driver circuit 40 as a third initial voltage Vinit3, and output the third initial voltage Vinit3 to the second electrode (for example, the drain) of the first reset transistor M1 in the pixel circuit 201 of the N$^{th}$ row of the sub pixels 20 and the first electrode (for example, the source) of the voltage modulation transistor Mc in the pixel circuit 201 of the N$^{th}$ row of the sub pixels 20 through the first initial voltage line S1.

The display driver circuit 40 may be coupled to the AP by using the FPC shown in FIG. 1*a*, so that the display driver circuit 40 can receive display data output by the AP, and the data voltage output port VO transmits the data voltage Vdata to the pixel circuit 201 of each sub pixel through the DL.

The following describes structures and functions of the pixel circuit 201 and the gating circuit 301 in detail by using one pixel circuit 201 and one gating circuit 301 in the N$^{th}$ row as an example.

Figure 8B:
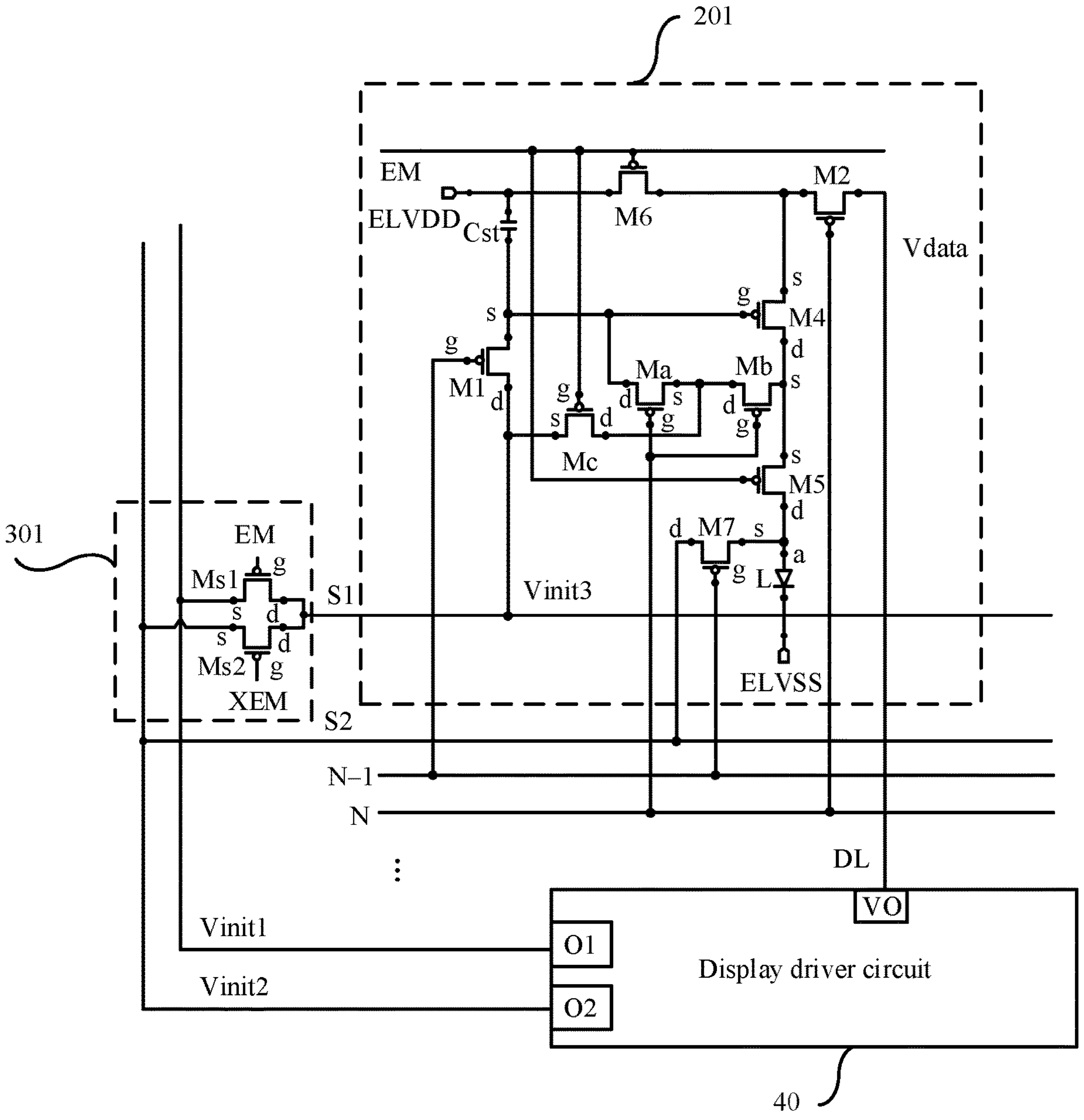
FIG. 8*b* is a schematic structural diagram of another display module according to an embodiment of this application.

Specifically, compared with the pixel circuit 201 shown in FIG. 2*a*, the pixel circuit shown in FIG. 8*b* further includes a first compensation transistor Ma, a second compensation transistor Mb, and the voltage modulation transistor Mc.

A difference between the pixel circuit 201 shown in FIG. 8*b* and the pixel circuit 201 shown in FIG. 2*a* is as follows: In the light-emitting phase (the third phase ③ in FIG. 3), the second reset transistor M7 separately receives the second initial voltage Vinit2, the first compensation transistor Ma and the second compensation transistor Mb are combined to replace the compensation transistor M3, and a connection point between the first compensation transistor Ma and the second compensation transistor Mb receives the first initial voltage Vinit1 through the voltage modulation transistor Mc and the second electrode (for example, the drain) of the first reset transistor M1. Because a source-drain path of the first compensation transistor Ma and a source-drain path of the second compensation transistor Mb are connected in series, a leakage current of the first compensation transistor Ma directly affects a leakage current obtained after the first compensation transistor Ma and the second compensation transistor Mb are combined. A relatively high first initial voltage Vinit1 (for example, 1V) is connected in the light-emitting phase (the third phase ③ in FIG. 3), to reduce the source-drain voltage Vsd of the first reset transistor M1 and the source-drain voltage Vsd of the first compensation transistor Ma. In this way, the leakage current of the first reset transistor M1 and the leakage current of the first compensation transistor Ma (equivalent to reducing the compensation transistor M3 described above) are separately reduced, to reduce a display flicker problem in the light-emitting phase.

Specifically, a first electrode (for example, a source s) of the first compensation transistor Ma is coupled to a second electrode (for example, a drain d) of the second compensation transistor Mb and a second electrode (for example, a drain d) of the voltage modulation transistor Mc. A second electrode (for example, a drain d) of the first compensation transistor Ma is coupled to the gate g of the driver transistor M4, the first end of the first capacitor Cst (for example, the lower plate of the first capacitor Cst in FIG. 2*a*), and the first electrode (for example, the source s) of the first reset transistor M1 phase.

A first electrode (for example, a source s) of the second compensation transistor Mb is coupled to the second electrode (for example, the drain d) of the driver transistor M4 and the anode of the light-emitting component L. A gate g of the first compensation transistor Ma and a gate s of the second compensation transistor Mb are configured to receive the gating signal N.

The first electrode (for example, the source s) of the voltage modulation transistor Mc is coupled to the second electrode (for example, the drain d) of the first reset transistor M1, and is coupled to the gating circuit 301 through the first initial voltage line S1, and is configured to receive the first initial voltage Vinit1 or the second initial voltage Vinit2 selected and output by the gating circuit 301. A gate g of the voltage modulation transistor Mc is configured to receive the light-emitting control signal EM.

The second electrode (for example, the drain d) of the second reset transistor M7 is coupled to the second signal end O2 of the display driver circuit 40 through an $N^{th}$ second initial voltage line S2, and is configured to receive the second initial voltage Vinit2.

It should be noted that a function of combining the first compensation transistor Ma and the second compensation transistor Mb is the same as a function of the compensation transistor M3 in FIG. 2*a*. For a connection relationship between components that are not described in the pixel circuit 201, refer to related descriptions in FIG. 2*b*. Details are not described herein again.

Each gating circuit 301 includes a first gating transistor Ms1 and a second gating transistor Ms2.

A first electrode (for example, a source s) of the first gating transistor Ms1 is coupled to the first signal end O1 of the display driver circuit 40, and is configured to receive the first initial voltage Vinit1 output by the first signal end O1 of the display driver circuit 40. A gate g of the first gating transistor Ms1 is configured to receive the light-emitting control signal EM. The light-emitting control signal is used to take effect in the light-emitting phase and fail in a non-light-emitting phase.

A first electrode (for example, a source s) of the second gating transistor Ms2 is coupled to the display driver circuit 40. Specifically, the first electrode (for example, the source s) of the second gating transistor Ms2 is coupled to the second signal end O2 of the display driver circuit 40, and is configured to receive the second initial voltage Vinit2 output by the second signal end O2 of the display driver circuit 40. The gate g of the second gating transistor Ms2 is configured to receive a phase-inverted signal XEM of the light-emitting control signal EM. The phase-inverted signal XEM of the control signal EM may be obtained by performing phase inversion on the light-emitting control signal EM by using a phase inverter (not shown in the figure).

A second electrode (for example, a drain d) of a first gating transistor Ms1 and a second electrode (for example, a drain d) of a second gating transistor Ms2 in the $N^{th}$ gating circuit 301 are coupled to the first electrode (for example, the source s) of the voltage modulation transistor Mc in the pixel circuit 201 of the $N^{th}$ row of sub pixels 20 and the second electrode (for example, the drain d) of the first reset transistor M1 in the pixel circuit 201 of the $N^{th}$ row of sub pixels 20 through the $N^{th}$ first initial voltage line S1.

The gating circuit 301 is configured to: in the reset phase (the first phase ① in FIG. 3) and the data voltage writing phase (the second phase ② in FIG. 3), output the second initial voltage Vinit2 to the second electrode (for example, the drain) of the first reset transistor M1 and the first electrode (for example, the source) of the voltage modulation transistor Mc through the first initial voltage line S1, and further configured to: in the light-emitting phase (the third phase ③ in FIG. 3), output the first initial voltage Vinit1 to the second electrode (for example, the drain) of the first reset transistor M1 and the first electrode (for example, the source) of the voltage modulation transistor Mc through the first initial voltage line S1.

Figure 9A:
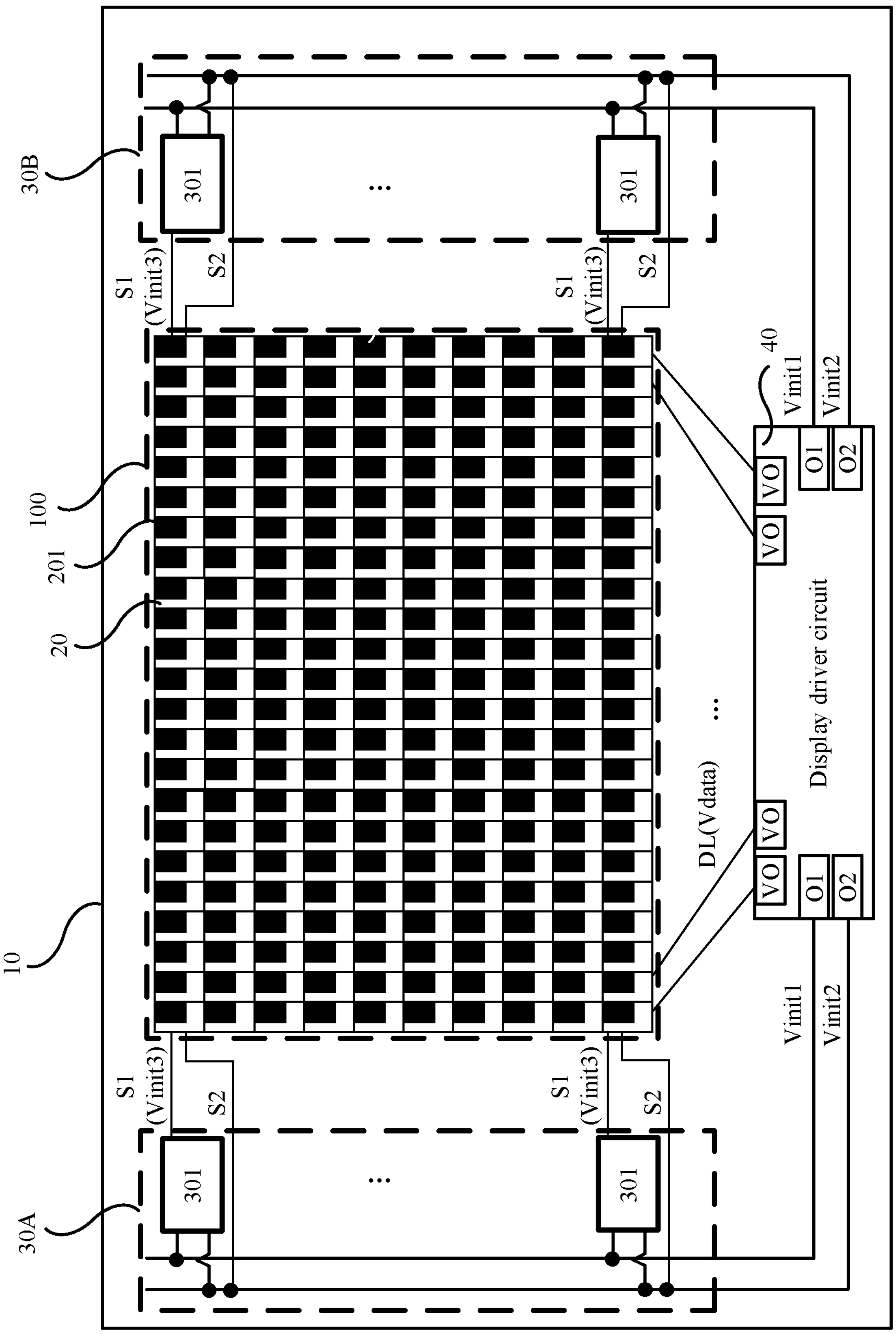
FIG. 9*a* is a schematic structural diagram of still another display module according to an embodiment of this application.

Based on this, the at least one driver group includes a first driver group 30A and a second driver group 30B shown in FIG. 9*a*. The first driver group 30A and the second driver group are respectively located on the left and the right of the display area 100 of the display.

Figure 9B:
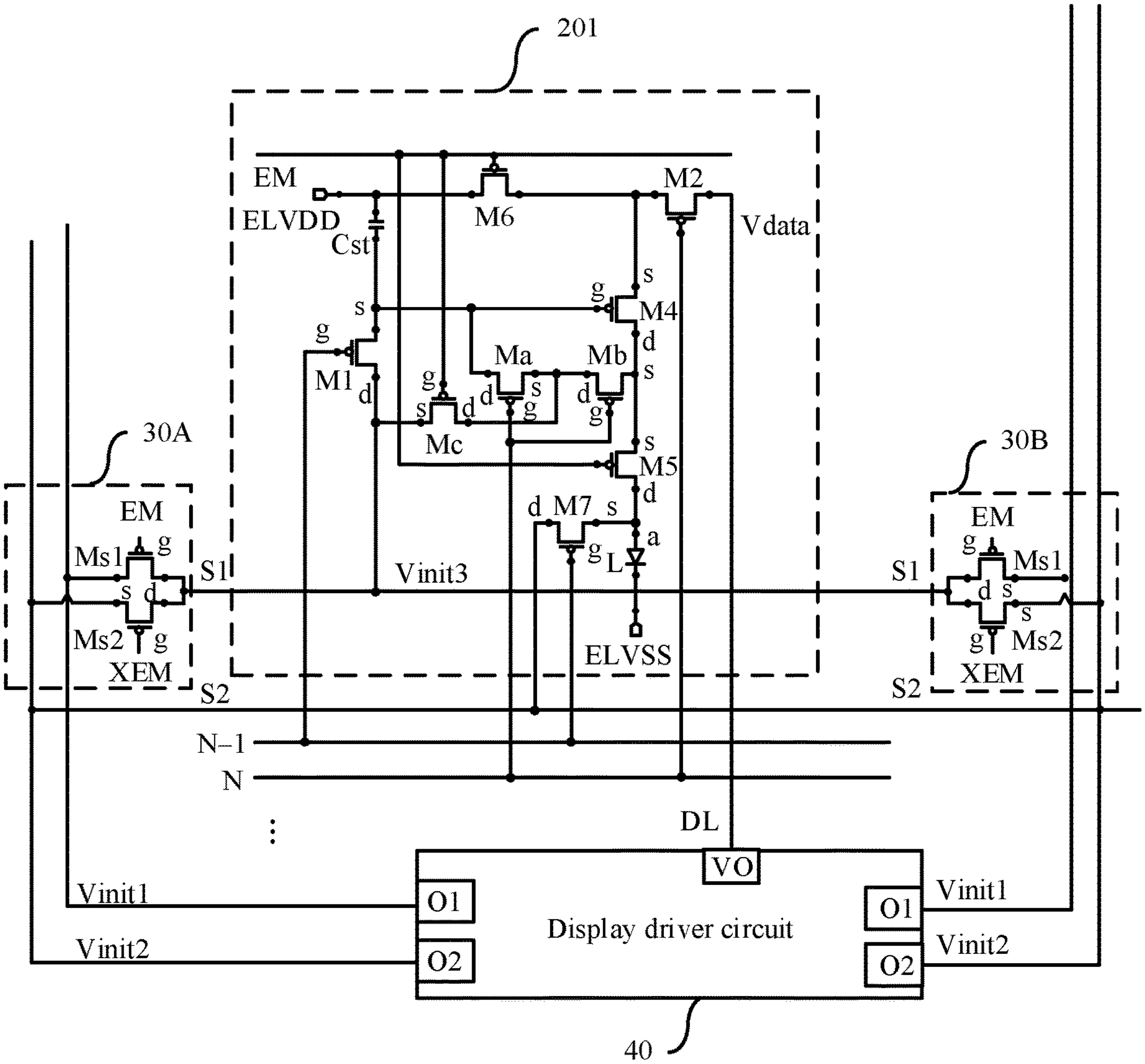
FIG. 9*b* is a schematic structural diagram of yet another display module according to an embodiment of this application.

Based on this, as shown in FIG. 9*b*, an $N^{th}$ gating circuit in the first driver group 30A and an $N^{th}$ gating circuit in the second driver group 30B are both coupled to the second electrode (for example, the drain d) of the first reset transistor M1 in the pixel circuit 201 of the $N^{th}$ row of sub pixels 20 and the first electrode (for example, the source) of the voltage modulation transistor Mc in the pixel circuit 201 of the $N^{th}$ row of sub pixels 20.

When a resolution of the display 10 is relatively high, there is a relatively large quantity of one row of sub pixels 20. If the driver group is disposed only on one side of one row of sub pixels 20, a received signal is attenuated at an end that is in one row of sub pixels 20 and that is relatively far away from an output end of a gating circuit in the driver group. In this way, signal accuracy is reduced.

Therefore, the first driver group 30A and the second driver group 30B are respectively disposed on the left side and the right side of the display area 100, so that one gating circuit in the first drive group 30A and one gating circuit in the second drive group 30B output the first initial voltage Vinit1 or the second initial voltage Vinit2 from the left side and the right side to the second electrode (for example, the drain d) of the first reset transistor M1 in a same row of sub pixels 20. In this way, a problem of signal attenuation can be effectively reduced.

The following uses different examples to describe structures of the gating circuit in the driver group 30 and the display 10 having the gating circuit.

The following uses FIG. 9*b* as an example to describe an operating manner of the foregoing circuit.

Regardless of the reset phase (the first phase ① in FIG. 3), the data voltage writing phase (the second phase ② in FIG. 3), and the light-emitting phase (the third phase ③ in FIG. 3), the second initial voltage Vinit2 is always at a low voltage level (for example, −4V). That is, a voltage of the second electrode (for example, the drain d) of the second reset transistor M7 is Vd7=Vinit2.

Figure 10:
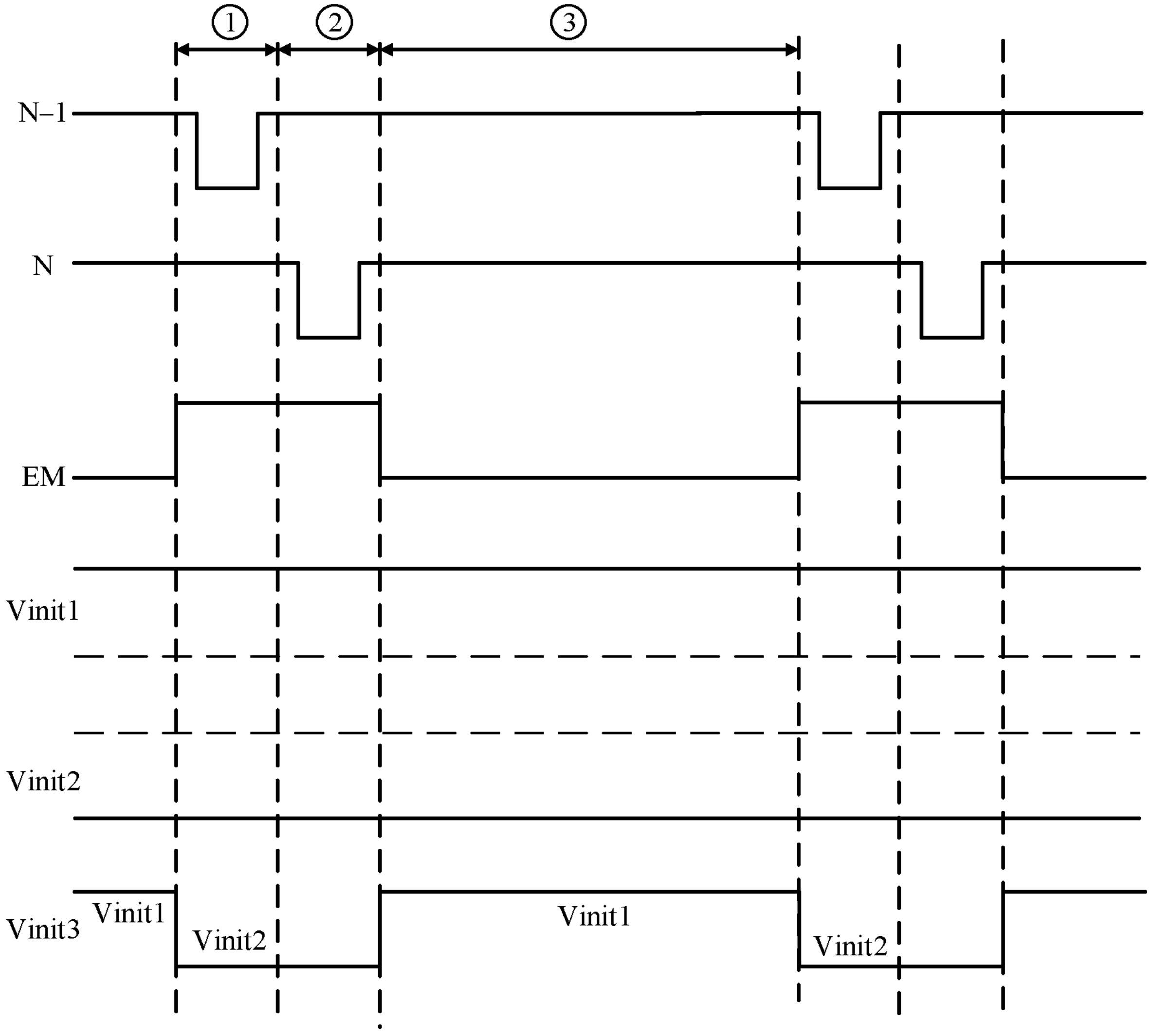
FIG. 10 is a schematic diagram of a signal time sequence according to an embodiment of this application.

Reset phase (first phase ① in FIG. 3):

As shown in FIG. 10, the gating circuit 301 selects to output the second initial voltage Vinit2, that is, the third initial voltage Vinit3 is equal to the second initial voltage Vinit2, the gating signal N−1 is switched from a high voltage level to a low voltage level, the gating signal N remains at a high voltage level, the light-emitting control signal EM is at a high voltage level, and the phase-inverted signal XEM of the light-emitting control signal EM is at a low voltage level.

Figure 11A:
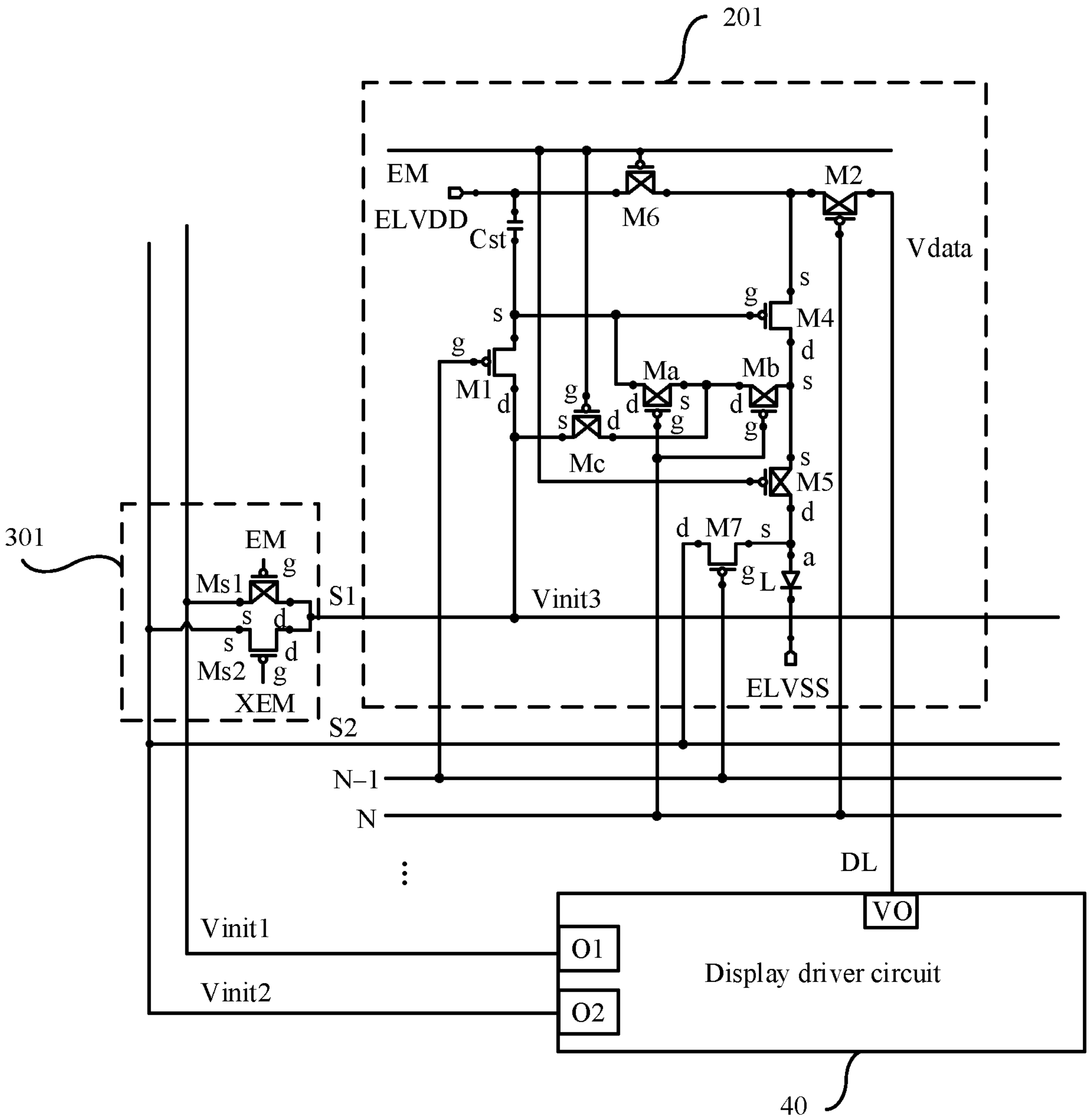
FIG. 11*a* is a schematic diagram of an equivalent circuit of a display module in a first phase ① shown in FIG. 8*a* according to an embodiment of this application.

As shown in FIG. 11*a*, because the gating signal N−1 is switched from the high voltage level to the low voltage level, the first reset transistor M1 and the second reset transistor M7 are conducted. The gating signal N remains at the high voltage level, so that the first compensation transistor Ma, the second compensation transistor Mb, and the data writing transistor M2 are cut off. The light-emitting control signal EM is at the high voltage level, and the phase-inverted signal XEM of the light-emitting control signal EM is at the low voltage level, so that the second light-emitting control transistor M6, the voltage modulation transistor Mc, and the first gating transistor Ms1 in the gating circuit 301 are cut off, and the second gating transistor Ms2 is conducted. In this way, the gating circuit 301 transmits, through the first initial voltage line S1, the second initial voltage Vinit2 output by the second signal end O2 of the display driver circuit 40 to the second electrode (for example, the drain d) of the first reset transistor M1 and the first electrode (for example, a source) of the voltage modulation transistor Mc.

Similar to the description in FIG. 2*b*, the third initial voltage Vinit3 (which is equal to the second initial voltage Vinit2 at this time) is transmitted to the gate g of the driver transistor M4 through the first reset transistor M1, to reset the gate g of the driver transistor M4. The second initial voltage Vinit2 is transmitted to the anode a of the light-emitting component L (for example, the OLED) through the second reset transistor M7, to reset the anode a of the light-emitting component L (for example, the OLED). In the reset phase (the first phase ① in FIG. 3), a voltage of the gate g of the driver transistor M4 and a voltage of the anode a of the light-emitting component L (for example, the OLED) may be reset to the initial voltage Vinit1, so as to prevent a previous frame of image from remaining on the voltage of the gate g of the driver transistor M4 and the voltage of the anode a of the light-emitting component L (for example, the OLED) and affecting a next frame of image.

As shown in Table 1, the drain-source voltage Vsd1 of the first reset transistor M1 is a conduction voltage drop of the transistor, which is about 0.1V. A manner of calculating a drain-source voltage Vsd_a of the first compensation transistor Ma is the same as a manner of calculating the drain-source voltage Vsd3 of the compensation transistor M3 in FIG. 2*b*, except that Vinit in FIG. 2*b* is changed to Vinit3 in FIG. 8*b*. That is, Vsd_a=Vinit3−(ELVSS+Voled).

TABLE 1

| | Unit V | | | | | |
|---|---|---|---|---|---|---|
| | Pixel circuit shown in FIG. 2a | | | Pixel circuit shown in FIG. 8b | | |
| | Vinit | Vsd1 | Vsd3 | Vinit3 | Vsd1 | Vsd_a |
| First phase ① | −4 | About 0.1 | Vinit − (ELVSS + Voled) | −4 (Vinit2) | 0.1 | Vinit3\| − (ELVSS + Voled) |
| Second phase ② | −4 | Vdata − \|Vth_M4\| − Vinit | About 0.1 | −4 (Vinit2) | Vdata − \|Vth_M4\| − Vinit3 | About 0.1 |
| Third phase ③ | −4 | | Vdata − \|Vth_M4\| − (ELVSS + Voled) | 1 (Vinit1) | Vdata − \|Vth_M4\| − Vinit3 | Vdata − \|Vth_M4\| − Vinit3 |

Data voltage writing phase (second phase ② in FIG. 3):

As shown in FIG. 10, the gating circuit 301 selects to output the second initial voltage Vinit2, that is, the third initial voltage Vinit3 is equal to the second initial voltage Vinit2, the gating signal N−1 is switched from the low voltage level to the high voltage level, the gating signal N is switched from the high voltage level to the low voltage level, and the light-emitting control signal EM is at the high voltage level, the phase-inverted signal XEM of the light-emitting control signal EM is at the low voltage level.

Figure 11B:
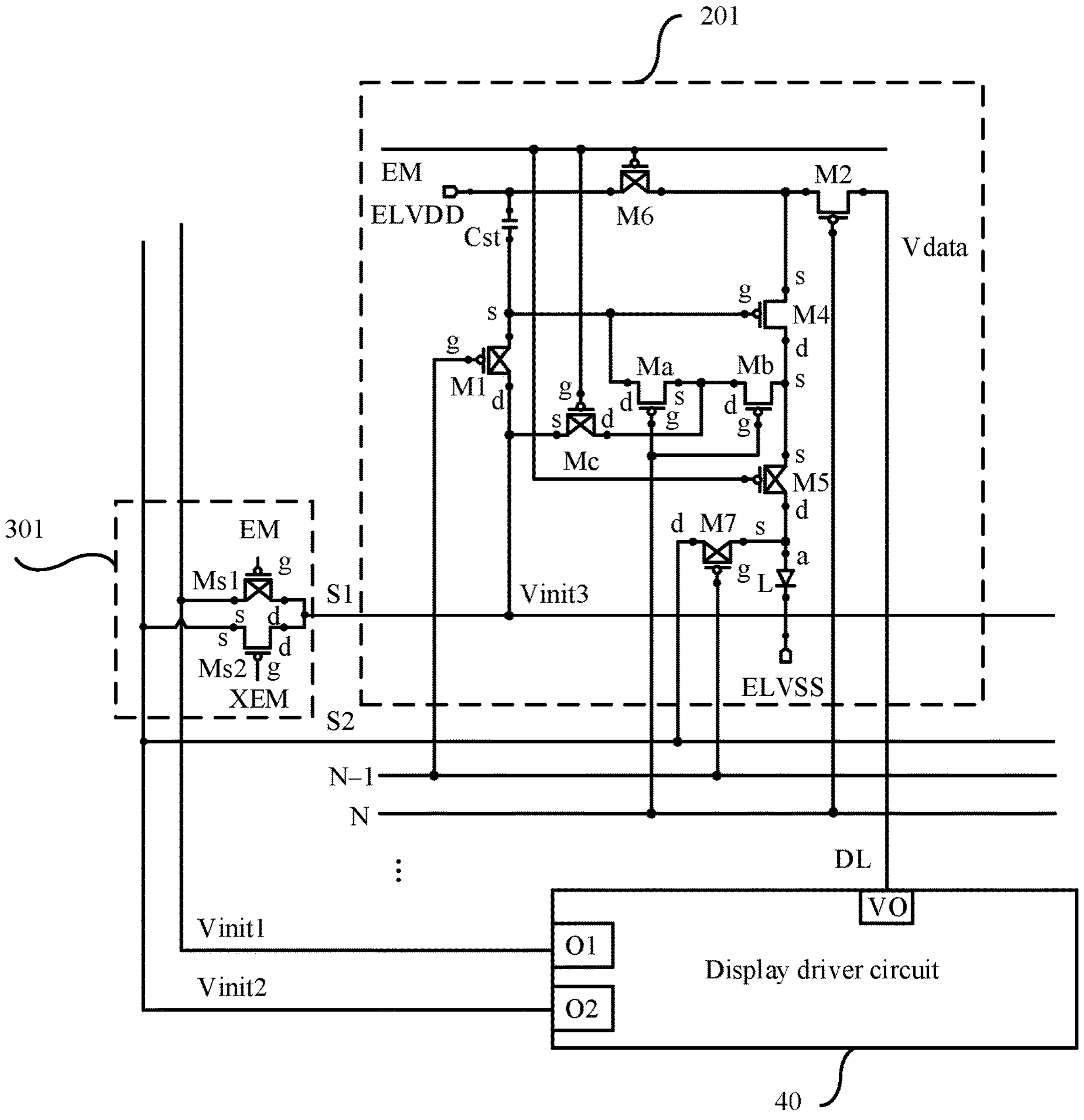
FIG. 11*b* is a schematic diagram of an equivalent circuit of a display module in a second phase ② shown in FIG. 8*a* according to an embodiment of this application.

As shown in FIG. 11*b*, because the gating signal N−1 is switched from the low voltage level to the high voltage level, the first reset transistor M1 and the second reset transistor M7 are cut off. The gating signal N is switched from the high voltage level to the low voltage level, so that the first compensation transistor Ma, the second compensation transistor Mb, and the data writing transistor M2 are conducted. The light-emitting control signal EM is at the high voltage level, and the phase-inverted signal XEM of the light-emitting control signal EM is at the low voltage level, so that the second light-emitting control transistor M6, the voltage modulation transistor Mc, and the first gating transistor Ms1 in the gating circuit 201 are cut off, and the second gating transistor Ms2 is conducted. In this way, the gating circuit 201 transmits, through the first initial voltage line S1, the second initial voltage Vinit2 output by the second signal end O2 of the display driver circuit 40 to the second electrode (for example, the drain d) of the first reset transistor M1 and the first electrode (for example, a source) of the voltage modulation transistor Mc.

In this case, when the first compensation transistor Ma and the second compensation transistor Mb are conducted, the gate g of the driver transistor M4 is coupled to the drain d of the driver transistor M4. In other words, the gate voltage Vg4 of the driver transistor M4 is the same as the drain d voltage Vd4, and the driver transistor M4 is in a conducting state. In this case, the data voltage Vdata is written to the source s of the driver transistor M4 through the conducted data writing transistor M2.

As shown in related descriptions in FIG. 2*c*, the gate voltage of the driver transistor M4 is Vg4=Vdata−|Vth_M4|. As shown in Table 1, the first reset transistor M1 is cut off, and the drain voltage of the first reset transistor M1 is Vd1=Vinit1=−4V. The source voltage Vs1 of the first reset transistor M1 is the same as the gate voltage Vg4 of the driver transistor M4, that is, Vs1=Vdata−N|Vth_M4|. Therefore, the drain-source voltage of the first reset transistor M1 is Vsd1=Vs1−Vd1=Vdata−|Vth_M4|−Vinit3=Vdata−|Vth_M4|−(−4). The drain-source voltage Vsd_a of the first compensation transistor Ma is the conduction voltage drop of the transistor, which is about 0.1V.

Light-emitting phase (third phase ③ in FIG. 3):

As shown in FIG. 10, the gating circuit 301 selects to output the first initial voltage Vinit1, that is, the third initial voltage Vinit3 is equal to the first initial voltage Vinit1, the gating signal N−1 and the gating signal N remain at the high voltage level, the light-emitting control signal EM is at the low voltage level, and the phase-inverted signal XEM of the light-emitting control signal EM is at the high voltage level.

Figure 11C:
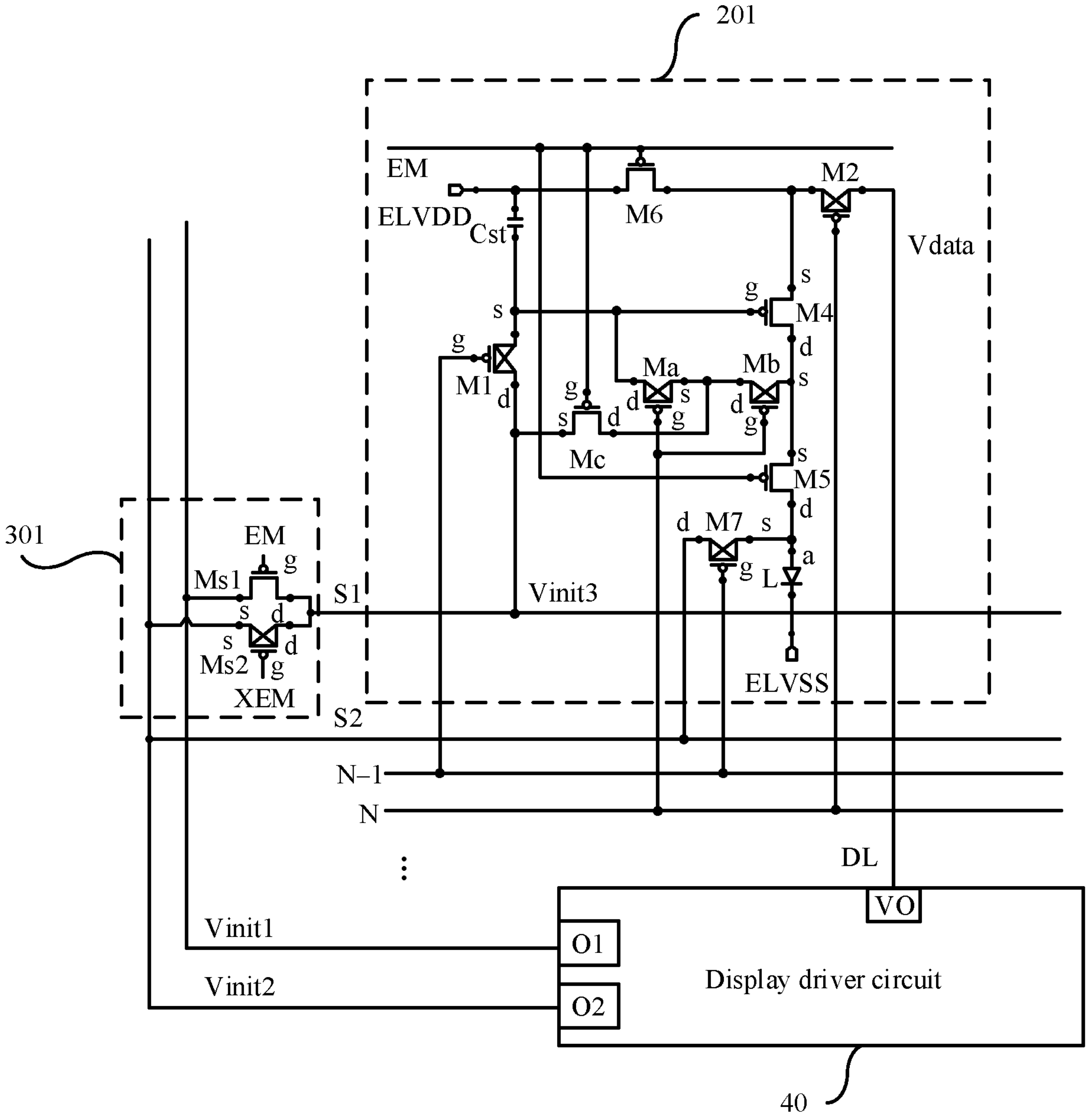
FIG. 11*c* is a schematic diagram of an equivalent circuit of a display module in a third phase ③ shown in FIG. 8*a* according to an embodiment of this application.

As shown in FIG. 11*c*, because the gating signal N is at the high voltage level, the first reset transistor M1 and the second reset transistor M7 are cut off. The gating signal N is at the high voltage level, so that the first compensation transistor Ma, the second compensation transistor Mb, and the data writing transistor M2 are cut off. The light-emitting control signal EM is at the low voltage level, and the phase-inverted signal XEM of the light-emitting control signal EM is at the high voltage level, so that the second light-emitting control transistor M6, the voltage modulation transistor Mc, and the first gating transistor Ms1 in the gating circuit 201 are conducted, and the second gating transistor Ms2 is cut off. The gating circuit 201 transmits, through the first initial voltage line S1, the first initial voltage Vinit1 output by the first signal end O1 of the display driver circuit 40 to the second electrode (for example, the drain d) of the first reset transistor M1 and the first electrode (for example, the source) of the voltage modulation transistor Mc.

As shown in related descriptions in FIG. 2*d*, because the first light-emitting control transistor M5 and the second light-emitting control transistor M6 are conducted, the current path between the first power voltage ELVDD and the second power voltage ELVSS is conducted. The first capacitor Cst generates a driver current Isd through the driver transistor M4, and transmits the driver current Isd to the light-emitting component L (for example, the OLED) through the current path, to drive the light-emitting component L (for example, the OLED) to emit light.

In this case, because the voltage modulation transistor Mc is conducted, it is equivalent to that the first electrode (for example, the source) of the first compensation transistor Ma is coupled to the second electrode (for example, the drain) of the first reset transistor. Therefore, both the source voltage Vs_a of the first compensation transistor Ma and the drain voltage Vd1 of the first reset transistor are equal to the first initial voltage Vinit1. The second electrode (for example, the drain d) of the first compensation transistor Ma is coupled to the first electrode (for example, the source) of the first reset transistor. Therefore, the drain voltage Vd_a of the first compensation transistor Ma is equal to the source voltage Vs1 of the first reset transistor. Therefore, the source-drain voltage Vsd_a of the first compensation transistor Ma is equal to the source-drain voltage Vsd1 of the first reset transistor Ml, that is, Vsd_a=Vsd1.

As shown in the related descriptions of FIG. 2*d*, the gate voltage of the driver transistor M4 is Vg4=Vdata−|Vth_M4|. Therefore, as shown in Table 1, the source-drain voltage of the first compensation transistor Ma is Vsd_a=Vsd1=Vs1−Vd1=Vdata−|Vth_M4|−Vinit3.

In the light-emitting phase (the third phase ③ in FIG. 3), the source-drain voltage Vsd1 of the first reset transistor M1 is changed from Vdata−|Vth_M4|−Vinit (the pixel circuit shown in FIG. 2*a*) to Vdata−|Vth_M4|−Vinit3 (the pixel circuit shown in FIG. 8*b*). A value of Vinit3 (which is equal to Vinit1 at this time) may be adjusted, so that Vinit3 (which is equal to Vinit1 at this time) is greater than Vinit (which is equal to Vinit2 at this time). In this way, the source-drain voltage Vsd1 of the first reset transistor M1 is reduced, and the leakage current of the first reset transistor M1 is further reduced. In this way, when a low refresh rate is used, a probability of a display flicker caused by a relatively large voltage drop of the gate voltage Vg4 of the driver transistor M4 in the light-emitting phase due to the leakage current is reduced.

In the light-emitting phase (the third phase ③ in FIG. 3), the source-drain voltage Vsd_a of the first compensation transistor Ma is changed from Vdata−|Vth_M4|−(ELVSS+Voled) (the pixel circuit shown in FIG. 2*a*) to Vdata−|Vth_M4|−Vinit3 (the pixel circuit shown in FIG. 8*b*). A value of Vinit1 (Vinit3) may be adjusted, so that Vinit1>(ELVSS+Voled). In this way, the source-drain voltage Vsd_a of the first compensation transistor Ma is reduced, and the leakage current obtained after the first compensation transistor Ma and the second compensation transistor Mb are combined (equivalent to the original compensation transistor M3) is further reduced. In this way, when a low refresh rate is used, a probability of a display flicker caused by a relatively large voltage drop of the gate voltage Vg4 of the driver transistor M4 in the light-emitting phase due to the leakage current is reduced.

In conclusion, when the first initial voltage Vinit1 is greater than the second initial voltage Vinit2, the leakage current of the first reset transistor M1 may be reduced. When the first initial voltage Vinit1 is greater than a sum of the second power voltage ELVSS and the voltage drop Voled of the light-emitting component L (for example, the OLED), the leakage current of the compensation transistor can be reduced. That is, the first initial voltage Vinit1 meets at least one of the following conditions: Vinit1>Vinit2 and Vinit1>(ELVSS+Voled).

For example, when Vth_M4=−1.5V, Vdata=2-6V, ELVSS=−3V, and Voled=2-4.5V, specific values of Table 1 are shown in Table 2.

It can be learned from the Table 2, in the light-emitting phase (the third phase ③ in FIG. 3), compared with the pixel circuit shown in FIG. 2*a*, in the pixel circuit shown in FIG. 8*b*, when an image with a low gray scale (for example, a gray scale 0) is displayed, the source-drain voltage Vsd1 of the first reset transistor M1 may be reduced by 8.5−3.5=4V. When an image of a medium gray scale (for example, a gray scale 127) is displayed, the source-drain voltage Vsd_a of the first compensation transistor Ma may be reduced by 3.5−2.5=1V. When an image with a high gray scale (for example, a gray scale 255) is displayed, the source-drain voltage Vsd_a of the first compensation transistor Ma may be reduced by |−1|−|−0.51=0.5V.

TABLE 2

| | Unit V | | | | | |
|---|---|---|---|---|---|---|
| | Pixel circuit shown in FIG. 2a | | | Pixel circuit shown in FIG. 8b | | |
| | Vinit | Vsd1 | Vsd3 | Vinit3 | Vsd1 | Vsd_a |
| First phase ① | −4 | About 0.1 | −5.5 (gray scale 255)<br>−3 (gray scale 0) | −4 | 0.1 | −5.5 (gray scale 255)<br>−3 (gray scale 0) |
| Second phase ② | −4 | 4.5 (gray scale 255)<br>8.5 (gray scale 0) | About 0.1 | −4 | 4.5 (gray scale 255)<br>8.5 (gray scale 0) | About 0.1 |
| Third phase ③ | −4 | | −1 (gray scale 255)<br>3.5 (gray scale 127) | 1 | 0.5 (gray scale 255)<br>3.5 (gray scale 0) | −0.5 (gray scale 255)<br>2.5 (gray scale 127) |

As described above, a value range of the first initial voltage Vinit1 may be Vinit1>0V. When the first initial voltage Vinit1 is less than 0V, in the light-emitting phase (the third phase ③ in FIG. 3), a change difference of the source-drain voltage Vsd1 of the first reset transistor M1 is relatively small. Therefore, in the light-emitting phase, the leakage current $I_{off\_M1}$ of the first reset transistor M1 cannot be effectively reduced, and a display flicker cannot be eliminated. In addition, when the first initial voltage Vinit1 is greater than 2V, a leakage current of the second reset transistor M7 flows to the light-emitting component L (for example, the OLED), so that the light-emitting component L (for example, the OLED) emits light when the sub pixels 20 display a black picture. In other words, a light leakage phenomenon is generated.

Figure 12:
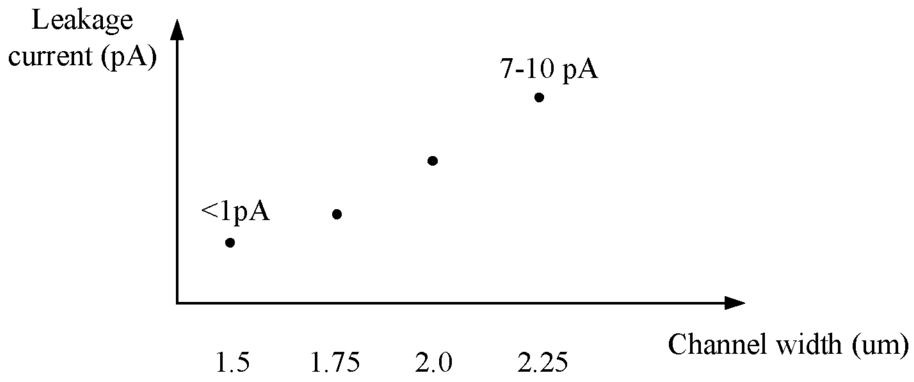
FIG. 12 is a schematic diagram of a relationship between a leakage current and a channel width according to an embodiment of this application.

For the foregoing manner of reducing the leakage current of the transistor by reducing a channel width of the transistor, a reason is as follows:

As shown in FIG. 12, a leakage current of a thin film transistor (TFT) increases with an increase of a channel width, and decreases with a decrease of the channel width. Therefore, leakage currents of the first reset transistor M1, the first compensation transistor Ma, and the second compensation transistor Mb may be reduced by reducing channel widths of the first reset transistor M1, the first compensation transistor Ma, and the second compensation transistor Mb, so that when a low refresh rate is used, a probability of a display flicker caused by a relatively large voltage drop of the gate voltage Vg4 of the driver transistor M4 in the light-emitting phase due to the leakage current is reduced.

For example, a channel width of a transistor at a refresh frequency of 60 Hz is usually 2 um, and a channel length of the transistor is 2.5 um. In a scenario in which a low refresh frequency is used, for the pixel circuit shown in FIG. 2*a*, a channel width of at least one of the first reset transistor M1, the compensation transistor M3, and the data writing transistor M2 is less than 2 um. For the pixel circuit shown in FIG. 8*b*, a channel width of at least one of the first reset transistor M1, the first compensation transistor Ma, the second compensation transistor Mb, the voltage modulation transistor Mc, and the data writing transistor M2 is less than or equal to 2 um. The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A display module, comprising a display, a display driver circuit, and at least one driver group, wherein the display comprises M rows of sub pixels arranged in a matrix form, and a pixel circuit of each sub pixel comprises a first compensation transistor, a second compensation transistor, a voltage modulation transistor, a driver transistor, a first reset transistor, a first capacitor, and a light-emitting component, wherein M≥2, and M is a positive integer;

for an Nth pixel circuit of the pixel circuits, a first electrode of the first compensation transistor is coupled to a second electrode of the second compensation transistor and a second electrode of the voltage modulation transistor, a second electrode of the first compensation transistor is coupled to a gate of the driver transistor, and a first end of the first capacitor is coupled to a first electrode of the first reset transistor; a first electrode of the second compensation transistor is coupled to a second electrode of the driver transistor and an anode of the light-emitting component, and a gate of the first compensation transistor and a gate of the second compensation transistor are configured to receive a same gating signal N; a first electrode of the voltage modulation transistor is coupled to a second electrode of the first reset transistor, a second end of the first capacitor is configured to couple to a first power voltage input end; a first electrode of the driver transistor is configured to couple to the first power voltage input end or a data voltage output port of the display driver circuit; a gate of the first reset transistor is can receive a gating signal N−1; and a cathode of the light-emitting component is configured to couple to a second power voltage input end, wherein 2≤N≤M, and N is a positive integer;

the first electrode is a source and the second electrode is a drain, or the first electrode is a drain and the second electrode is a source;

each driver group comprises M gating circuits; the $N^{th}$ gating circuit in the driver group is coupled to the second electrode of the first reset transistor in a pixel circuit of an $N^{th}$ row of sub pixels and the first electrode of the voltage modulation transistor in the pixel circuit of the $N^{th}$ row of sub pixels; the $N^{th}$ gating circuit is further coupled to the display driver circuit, and is configured to: receive a first initial voltage Vinit1 and a second initial voltage Vinit2 from the display driver circuit, output the second initial voltage Vinit2 to the second electrode of the first reset transistor and the first electrode of the voltage modulation transistor when the pixel circuit is in a reset phase and a data voltage writing phase, and output the first initial voltage Vinit1 to the second electrode of the first reset transistor and the first electrode of the voltage modulation transistor when the pixel circuit is in a light-emitting phase; and the first initial voltage Vinit1 meets at least one of the following conditions: Vinit1>Vinit2 and Vinit1>(ELVSS+Voled), wherein ELVSS is a voltage output by the second power voltage input end, and Voled is a voltage drop of the light-emitting component; and the reset phase is a phase in which the first reset transistor is conducted, the data voltage writing phase is a phase in which the data voltage is applied to the first electrode of the driver transistor, and the light-emitting phase is a phase in which the light-emitting component emits light.

2. The display module according to claim 1, wherein the display further comprises M first initial voltage lines, each gating circuit comprises a first gating transistor and a second gating transistor, the display driver circuit comprises at least one first signal end and at least one second signal end;

a second electrode of the first gating transistor in the $N^{th}$ gating circuit and a second electrode of the second gating transistor in the $N^{th}$ gating circuit are coupled to the first electrode of the voltage modulation transistor in the pixel circuit of the $N^{th}$ row of sub pixels and the second electrode of the first reset transistor M1 in the pixel circuit of the $N^{th}$ row of sub pixels through an $N^{th}$ first initial voltage line;

a first electrode of the first gating transistor is coupled to the first signal end, and a first electrode of the second gating transistor is coupled to the second signal end; and a gate of the first gating transistor is configured to receive a light-emitting control signal, and a gate of the second gating transistor is configured to receive a phase-inverted signal of the light-emitting control signal, wherein the light-emitting control signal takes effect in the light-emitting phase and fails in a non-light-emitting phase.

3. The display module according to claim 2, wherein the display further comprises M second initial voltage lines, and the pixel circuit further comprises a second reset transistor; and a first electrode of the second reset transistor is coupled to the light-emitting component, a second electrode of the second reset transistor in the pixel circuit of the $N^{th}$ row of sub pixels is coupled to the second signal end of the display driver circuit through an $N^{th}$ second initial voltage line, and a gate of the second reset transistor is coupled to the gate of the first reset transistor.

4. The display module according to claim 1, wherein the at least one driver group comprises a first driver group and a second driver group, and the first driver group and the second driver group are respectively located on the left and the right of a display area of the display; and both an $N^{th}$ gating circuit in the first driver group and an $N^{th}$ gating circuit in the second driver group are coupled to the second electrode of the first reset transistor in the pixel circuit of the $N^{th}$ row of sub pixels and the first electrode of the voltage modulation transistor in the pixel circuit of the $N^{th}$ row of sub pixels.

5. The display module according to claim 1, wherein the display module comprises a substrate; the pixel circuit, the display driver circuit, and the driver group are disposed on the substrate; and a material of the substrate comprises a glass substrate, a flexible material, or a tensile material.

6. The display module according to claim 1, wherein a value range of the first initial voltage Vinit1 is Vinit1>0V.

7. The display module according to claim 1, wherein the pixel circuit further comprises a data writing transistor, a first electrode of the data writing transistor is configured to receive the data voltage output by the data voltage output port of the display driver circuit, a second electrode of the data writing transistor is coupled to the first electrode of the driver transistor, a gate of the data writing transistor is configured to receive a gating signal N, and a channel width of the data writing transistor is less than or equal to 2 um.

8. The display module according to claim 1, wherein a channel width of at least one of the first reset transistor, the first compensation transistor, the second compensation transistor, and the voltage modulation transistor is less than or equal to 2 um.

9. A display module, comprising a display and a display driver circuit, wherein the display comprises M rows of sub pixels arranged in a matrix form, a pixel circuit of each sub pixel comprises a data writing transistor, a compensation transistor, a driver transistor, a first reset transistor, a first capacitor, and a light-emitting component, wherein M≥2, and M is a positive integer;

for an Nth pixel circuit of the pixel circuits, a first electrode of the data writing transistor is configured to receive a data voltage output by a data voltage output port of the display driver circuit, a second electrode of the data writing transistor is coupled to a first electrode of the driver transistor, and a gate of the data writing transistor is configured to receive a gating signal N; a first electrode of the compensation transistor is coupled to a second electrode of the driver transistor and the light-emitting component, a second electrode of the compensation transistor is coupled to a gate of the driver transistor, a first end of the first capacitor, and a first electrode of the first reset transistor, and a gate of the compensation transistor is configured to receive the gating signal N; a second end of the first capacitor is coupled to a first power voltage input end; a gate of the first reset transistor can receive a gating signal N−1; and a second electrode of the first reset transistor can receive an initial voltage Vinit, wherein 2≤N≤M, and N is a positive integer;

the first electrode is a source and the second electrode is a drain, or the first electrode is a drain and the second electrode is a source, the first power voltage input end is configured to input a first power voltage, and the data voltage output port is configured to output a data voltage; and a channel width of at least one of the first reset transistor, the compensation transistor, and the data writing transistor is less than 2 um.

10. An electronic device, comprising the display module according to claim 1.

* * * * *